United States Patent
Shen et al.

(10) Patent No.: US 11,563,518 B2
(45) Date of Patent: Jan. 24, 2023

(54) METHOD AND DEVICE OF CYCLIC REDUNDANCY CHECK

(71) Applicant: VIVO MOBILE COMMUNICATION CO., LTD., Guangdong (CN)

(72) Inventors: Xiaodong Shen, Chang'an Dongguan (CN); Xueming Pan, Chang'an Dongguan (CN); Zichao Ji, Chang'an Dongguan (CN); Peng Sun, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 382 days.

(21) Appl. No.: 16/637,243

(22) PCT Filed: Aug. 8, 2018

(86) PCT No.: PCT/CN2018/099382
§ 371 (c)(1),
(2) Date: Feb. 6, 2020

(87) PCT Pub. No.: WO2019/029566
PCT Pub. Date: Feb. 14, 2019

(65) Prior Publication Data
US 2020/0252158 A1     Aug. 6, 2020

(30) Foreign Application Priority Data

Aug. 8, 2017  (CN) .......................... 201710672362.9
Aug. 8, 2017  (CN) .......................... 201710672808.8

(51) Int. Cl.
*H04L 1/00*     (2006.01)
*G06F 11/10*    (2006.01)

(52) U.S. Cl.
CPC ........ *H04L 1/0061* (2013.01); *G06F 11/1004* (2013.01); *H04L 1/0041* (2013.01); *H04L 1/0045* (2013.01)

(58) Field of Classification Search
CPC ... G06F 11/1004; H03M 13/09; H03M 13/27; H03M 13/6525; H04L 1/0041;
(Continued)

(56) References Cited

U.S. PATENT DOCUMENTS 10,135,572 B2   11/2018   Zhang et al.
2002/0108086 A1  8/2002   Irvin et al.
(Continued)

FOREIGN PATENT DOCUMENTS

CN     1372735 A     10/2002
CN     101207467 A   6/2008
(Continued)

OTHER PUBLICATIONS

EP Search Report in Application No. 18843017.7 dated Nov. 11, 2020.
(Continued)

*Primary Examiner* — Shelly A Chase
(74) *Attorney, Agent, or Firm* — Maschoff Brennan

(57) ABSTRACT

A method and a device of cyclic redundancy check are provided. The method includes determining a payload portion, the payload portion including at least one information field for carrying information bits; determining input bits for generating CRC bits, the input bits including information bits carried in a part or all of at least one information field; generating target CRC bits according to the input bits; generating control information including the payload portion and the target CRC bits.

18 Claims, 11 Drawing Sheets

(58) Field of Classification Search
CPC ... H04L 1/0045; H04L 1/0057; H04L 1/0061; H04L 1/0083
See application file for complete search history.

(56) References Cited

U.S. PATENT DOCUMENTS

| | | | |
|---|---|---|---|
| 2005/0114489 A1 | 5/2005 | Yonge, III et al. | |
| 2008/0310352 A1* | 12/2008 | McBeath | H04L 1/0061 370/329 |
| 2009/0077456 A1* | 3/2009 | Pi | H04L 1/0061 714/E11.032 |
| 2010/0031124 A1 | 2/2010 | Shinagawa et al. | |
| 2011/0239098 A1* | 9/2011 | Fisher-Jeffes | H03M 13/091 714/E11.032 |
| 2012/0195302 A1 | 8/2012 | Park et al. | |
| 2013/0259017 A1 | 10/2013 | Zhang et al. | |
| 2014/0204887 A1 | 7/2014 | Chung et al. | |
| 2014/0341143 A1 | 11/2014 | Yang et al. | |
| 2016/0080168 A1 | 3/2016 | Lieder et al. | |
| 2017/0093529 A1 | 3/2017 | Robert Safavi et al. | |

FOREIGN PATENT DOCUMENTS

| | | |
|---|---|---|
| CN | 101715211 A | 5/2010 |
| CN | 101778449 A | 7/2010 |
| CN | 102111896 A | 6/2011 |
| CN | 103414533 A | 11/2013 |
| CN | 104247316 A | 12/2014 |
| CN | 105324960 A | 2/2016 |
| CN | 106464425 A | 2/2017 |
| WO | 01/03356 A1 | 11/2001 |
| WO | 2006/069392 A1 | 6/2006 |
| WO | 2013109109 A1 | 7/2013 |

OTHER PUBLICATIONS

European Search Report in Application No. 18843017.7 dated Jul. 27, 2020.
CN Office Action in Application No. 201710672362.9 dated Jul. 31, 2019.
CN Office Action in Application No. 201710672808.8 dated Aug. 2, 2019.
CN Office Action in Application No. 201710672808.8 dated Nov. 14, 2019.
CN Office Action in Application No. 201710672362.9 dated Feb. 6, 2020.
Written Opinion and International Search Report in Application No. PCT/CN2018/099382 dated Feb. 27, 2020.

* cited by examiner

METHOD AND DEVICE OF CYCLIC REDUNDANCY CHECK

CROSS-REFERENCE TO RELATED APPLICATION

This application is a U.S. national phase application of a PCT Application No. PCT/CN2018/099382 filed on Aug. 8, 2018, which claims priority to a Chinese Patent Application No. 201710672362.9 filed in China on Aug. 8, 2017 and a Chinese Patent Application No. 201710672808.8 filed in China on Aug. 8, 2017, the disclosures of which are incorporated herein by reference in their entireties.

TECHNICAL FIELD

The present disclosure relates to the field of communication technology, and more particularly, relates to a method of cyclic redundancy check and a device of cyclic redundancy check.

BACKGROUND

Cyclic Redundancy Check (CRC) is a check method commonly used in a data communication field. The CRC is essentially an error detection function in data transmission. A sending-end device performs polynomial calculation on data, and attaches an obtained result to the rear of a frame to be transmitted, and a receiving-end device also performs similar polynomial calculation on the data to ensure correctness and integrity of the data transmission.

For a CRC check to control information in a related Physical Downlink Control Channel (PDCCH), the receiving-end device may also consider that an error occurs in the transmitted control information in a case that there is no error in transmitted Information Bits, but there is an error in transmitted Padding Bits, thereby resulting in a poor link performance of a communication system, and a related CRC checking method cannot satisfy personalized requirements of different pieces of control information on a Block Error Rate (BLER) and a False Alarm, thus affecting reception performance of control information.

SUMMARY

The present disclosure provides a method of cyclic redundancy check and a device of cyclic redundancy check.

In a first aspect, the present disclosure provides a method of cyclic redundancy check applied to a sending-end device. The method includes: determining a payload portion, the payload portion including at least one information field, the at least one information field being used for carrying information bits; determining input bits for generating cyclic redundancy check (CRC) bits, the input bits including information bits carried in a part or all of at least one information field; generating target CRC bits according to the input bits; generating control information including the payload portion and the target CRC bits.

In a second aspect, the present disclosure provides a method of cyclic redundancy check applied to a receiving-end device. The method includes receiving control information; checking the control information according to input bits and target cyclic redundancy check (CRC) bits; wherein the control information includes a payload portion and target CRC bits, the payload portion includes at least one information field for carrying information bits, the target CRC bits are generated by a sending-end device based on input bits used for generating CRC bits, the input bits include information bits carried in a part or all of at least one information field.

In a third aspect, the present disclosure provides a sending-end device. The sending-end device includes a first processing module, used to determine a payload portion, the payload portion including at least one information field, the at least one information field being used for carrying information bits; and further used to determine input bits for generating cyclic redundancy check (CRC) bits, the input bits including information bits carried in a part or all of at least one information field; a second processing module, used to generate target CRC bits according to the input bits; and further used to generate control information including the payload portion and the target CRC bits.

In a fourth aspect, the present disclosure provides a receiving-end device. The device includes a transceiving module, used to receive control information; a processing module, used to check the control information according to input bits and target cyclic redundancy check (CRC) bits; wherein the control information includes a payload portion and target CRC bits, the payload portion includes at least one information field for carrying information bits, the target CRC bits are generated by a sending-end device based on input bits used for generating CRC bits, the input bits include information bits carried in a part or all of at least one information field.

In a fifth aspect, the present disclosure provides a sending-end device. The device includes: a storage, a processor, and a cyclic redundancy check program stored on the storage and executable by the processor, wherein in a case that the cyclic redundancy check program is executed by the processor, the processor implements steps of the method of cyclic redundancy check according to the first aspect.

In a sixth aspect, the present disclosure provides a receiving-end device. The device includes a storage, a processor, and a cyclic redundancy check program stored on the storage and executable by the processor, wherein in a case that the cyclic redundancy check program is executed by the processor, the processor implements steps of the method of cyclic redundancy check according to the second aspect.

In a seventh aspect, the present disclosure provides a computer readable storage medium, wherein, a cyclic redundancy check program is stored on the computer readable storage medium, and in a case that the cyclic redundancy check program is executed by a processor, the processor implements steps of the method of cyclic redundancy check according to the first aspect.

In an eighth aspect, the present disclosure provides a computer readable storage medium, wherein, a cyclic redundancy check program is stored on the computer readable storage medium, and in a case that the cyclic redundancy check program is executed by a processor, the processor implements steps of the method of cyclic redundancy check according to the second aspect.

In a ninth aspect, the present disclosure provides a computer program product including instructions. In a case that a computer executes instructions in the compute program product, the computer performs the method of cyclic redundancy check in the above first aspect. Specifically, the computer program product may be executed on the sending-end device according to the above third aspect.

In a ten aspect, the present disclosure provides a computer program product including instructions. In a case that a computer executes instructions in the compute program product, the computer performs the method of cyclic redundancy check in the above second aspect. Specifically, the computer program product may be executed on the sending-end device according to the above fourth aspect.

In an eleventh aspect, the present disclosure provides a method of cyclic redundancy check, applied to a sending-end device, the method includes: determining a payload portion, the payload portion including at least one information field for carrying information bits; determining a generation scheme of target cyclic redundancy check (CRC) bits, the generation scheme of target CRC bits is one of a plurality of generation schemes of CRC bits; generating CRC bits according to the payload portion and the generation scheme of target CRC bits; generating control information including the payload portion and the CRC bits.

In a twelfth aspect, the present disclosure provides a method of cyclic redundancy check applied to a receiving-end device. the method includes: receiving control information; checking the control information according to a plurality of generation schemes of CRC bits and cyclic redundancy check (CRC) bits, wherein the control information includes a payload portion and CRC bits, the payload portion includes at least one information field for carrying information bits, the CRC bits are generated by a sending-end device according to a generation scheme of target CRC bits and the payload portion, the generation scheme of target CRC bits is one of a plurality of generation schemes of CRC bits.

In a thirteenth aspect, the present disclosure provides a sending-end device. The sending-end device includes: a first processing module, used to determine a payload portion, the payload portion including at least one information field for carrying information bits; and further used to determine a target cyclic redundancy check (CRC) bit generation scheme, wherein the generation scheme of target CRC bits is one of a plurality of generation schemes of CRC bits; a second processing module, used to generate CRC bits according to the payload portion and the generation scheme of target CRC bits; and further used to generate control information including the payload portion and the CRC bits.

In a fourteenth aspect, the present disclosure provides a receiving-end device. The receiving-end device includes a transceiving module, used to receive control information; a processing module, used to check the control information according to a plurality of generation schemes of CRC bits and cyclic redundancy check (CRC) bits, wherein the control information includes a payload portion and CRC bits, the payload portion includes at least one information field for carrying information bits, the CRC bits are generated by the sending-end device according to a generation scheme of target CRC bits and the payload portion, the generation scheme of target CRC bits is one of a plurality of generation schemes of CRC bits.

In a fifteenth aspect, the present disclosure provides a sending-end device. The device includes a storage, a processor, and a cyclic redundancy check program stored on the storage and executable by the processor, wherein in a case that the cyclic redundancy check program is executed by the processor, the processor implements steps of the method of cyclic redundancy check according to the eleventh aspect.

In a sixteenth aspect, the present disclosure provides a receiving-end device. The device includes a storage, a processor, and a cyclic redundancy check program stored on the storage and executable by the processor, wherein in a case that the cyclic redundancy check program is executed by the processor, the processor implements steps of the method of cyclic redundancy check according to the twelfth aspect.

In a seventeenth aspect, the present disclosure provides a computer readable storage medium, wherein, a cyclic redundancy check program is stored on the computer readable storage medium, and in a case that the cyclic redundancy check program is executed by a processor, the processor implements steps of the method of cyclic redundancy check according to the eleventh aspect.

In an eighteenth aspect, the present disclosure provides a computer readable storage medium, wherein, a cyclic redundancy check program is stored on the computer readable storage medium, and in a case that the cyclic redundancy check program is executed by a processor, the processor implements steps of the method of cyclic redundancy check according to according to the twelfth aspect.

In a nineteenth aspect, the present disclosure provides a computer program product including instructions. In a case that a computer executes instructions in the compute program product, the computer performs the method of cyclic redundancy check in the above first aspect. Specifically, the computer program product may be executed on the sending-end device according to the above thirteenth aspect.

In a twentieth aspect, the present disclosure provides a computer program product including instructions. In a case that a computer executes instructions in the compute program product, the computer performs the method of cyclic redundancy check in the above twelfth aspect. Specifically, the computer program product may be executed on the sending-end device according to the above fourteenth aspect.

BRIEF DESCRIPTION OF THE DRAWINGS

In order to more clearly illustrate some embodiments of the present disclosure or technical solutions in the related art, accompanying drawings to be used in description of the embodiments or the related art will be briefly described below. It will be apparent that the accompanying drawings in the following description are merely some of the embodiments described in the present disclosure, and for those of ordinary skills in the art, other drawings may be obtained from these drawings without paying any creative labor.

DETAILED DESCRIPTION

Figure 1:
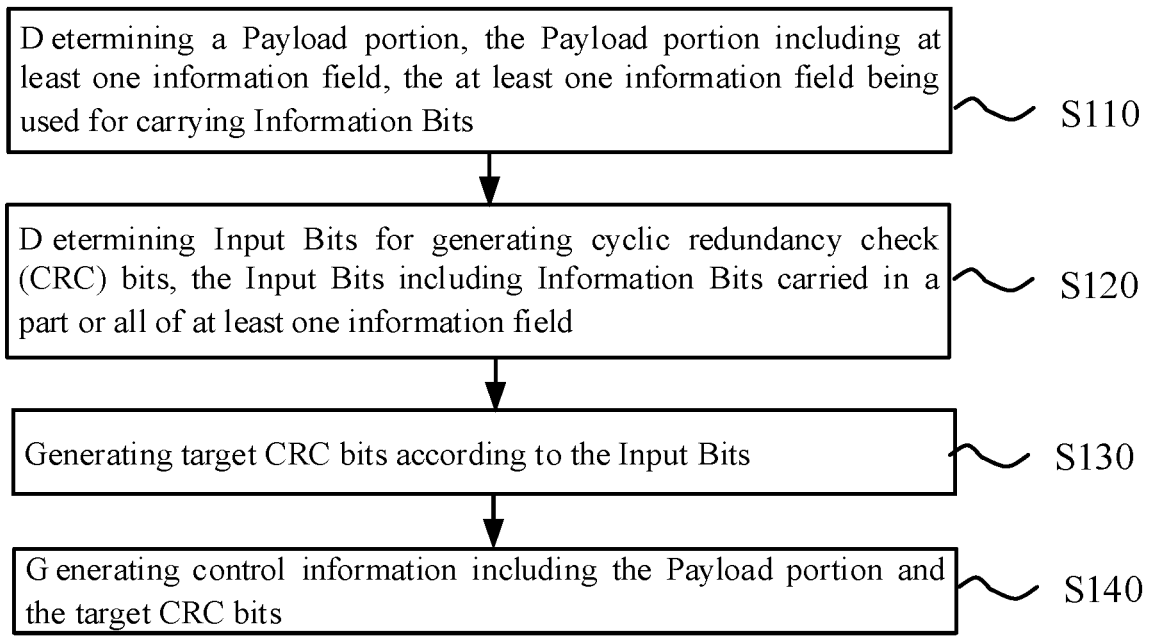
FIG. 1 is a first schematic flow chart of a method of cyclic redundancy check according to some embodiments of the present disclosure.

In order for those skilled in the art to better understand technical solutions in the present disclosure, the technical solutions in some embodiments of the present disclosure will be clearly and completely described below in connection with the drawings in some embodiments of the present disclosure. It will be apparent that the described embodiments are only a part, rather than all, of the embodiments of the present disclosure. Based on the embodiments of the present disclosure, all other embodiments obtained by those of ordinary skill in the art without paying creative work should be within the scope of the present disclosure.

It should be understood that technical solutions of some embodiments of the present disclosure may be applied to various communication systems, such as a Global System Of Mobile Communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunication System (UMTS) or a Worldwide Interoperability for Microwave Access (WiMAX) communication system, a Fifth Generation (5G) system, or a New Radio (NR) system.

In some embodiments of the present disclosure, the sending-end device may be a network device, and correspondingly, the receiving-end device is a terminal device. Optionally, the sending-end device may be a terminal device, and correspondingly, the receiving-end device is a network device.

In some embodiments of the present disclosure, a terminal device may include, but is not limited to, a Mobile Station (MS), a Mobile Terminal, a Mobile Telephone, a User Equipment (UE), a handset and a portable equipment, a Vehicle, etc. The terminal device may communicate with one or more core networks via a Radio Access Network (RAN), for example, the terminal device may be a mobile telephone (or a "cellular" telephone), such as a computer having a wireless communication function; the terminal device may also be a portable, a pocket-sized, a hand-held, a computer built-in or a vehicle-mounted mobile device.

In some embodiments of the present disclosure, a network device is a device deployed in a wireless access network and used for providing wireless communication functionality for a terminal device. The network device may be a base station, and the base station may include various forms of a macro base station, a micro base station, a relay station, an access point, or the like. In systems employing different radio access technologies, names of devices with functionality of a base station may vary. Such as in an LTE network, the device with functionality of the base station is referred to as an Evolved Node B (an evolved Node B, or eNB); in a Third Generation (3G) network, the device with functionality of the base station is referred to as a Node B or the like.

The method of cyclic redundancy check and the device of cyclic redundancy check provided by some embodiments of the present disclosure may solve a problem of poor link performance of a communication system.

Before describing specific embodiments, a basic principle of Cyclic Redundancy Check (CRC) is introduced. The CRC check concatenates an R-bits CRC code after a K-bits information code, and an entire code length is N. This code is also called a (N, K) code. For a given (N, K) code, it can be proved that there exists a polynomial G (x) which has a highest power N−K=R. A check code of the K-bit information code can be produced from G (x), and G (x) is called a generator polynomial of the CRC code. A specific generation process of the CRC code is as follows: assuming that information to be sent is represented by a polynomial C (x), shifting C (x) to the left by R bits (which can be represented as C (x)*$2^R$) so that R bits are left out on the right side of C (x) which is a position of the CRC code, and a remainder obtained by dividing C (x)*$2^R$ by the generator polynomial G (x) is the CRC code.

FIG. 1 illustrates a method of cyclic redundancy check 100 according to some embodiments of the present disclosure. The method 100 may be performed by a sending-end device. As shown in FIG. 1, the method 100 includes steps S110-S140.

S110: determining a Payload portion, the Payload portion including at least one information field, the at least one information field being used for carrying Information Bits.

Optionally, there may be multiple control information with different formats in a New Radio (NR) system, and sizes of the control information with different formats may vary. If the receiving-end device is required to perform blind detection on the formats of the control information, the receiving-end device may be caused to have high complexity, and therefore, in some embodiments of the present disclosure, the control information with different formats may be aligned by adding Padding Bits at a tail of a piece of control information having a short length, to reduce the complexity of the receiving-end device, wherein, the Padding Bits are usually "0" or "nil" or "1" and the nil equals null meaning 'null' or 'invalid'.

Specifically, in some embodiments, the sending-end device determines whether or not there are the Padding Bits according to a format of control information to be generated, and if there are the Padding Bits, then the Payload portion further includes a padding field. The padding field is used to carry the Padding Bits.

S120: determining Input Bits for generating cyclic redundancy check (CRC) bits, the Input Bits including Information Bits carried in a part or all of at least one information field.

It should be noted that if, in S110, the Payload portion includes only one information field, then in S120, the Input Bits including the Information Bits carried in a part or all of at least one information field should be understood as: the Input Bits including the Information Bits carried in the information field.

It should also be noted that in some embodiments of the present disclosure, Cyclic Redundancy Check (CRC) bits may also be referred to as a "CRC code".

S130: generating target CRC bits according to the Input Bits.

In particular, in some embodiments, the sending-end device may generate the target CRC bits according to a generation scheme of the CRC code described above.

S140: generating control information including the Payload portion and the target CRC bits.

Generation scheme of CRC bits includes generating of parity bits based on the Information Bits and necessary scrambling of the parity bits. For example, in the LTE, a Radio Network Temporary Identity (RNTI) is a sequence of 16 bits; each bit of a 16-bit CRC is scrambled by using the 16-bit RNTI (i.e., an Exclusive OR (XOR) operation is performed). Then, at the receiving-end, different RNTIs are used to descramble the CRC in different states, so as to acquire contents on the PDCCH, and identify information belongs to the receiving end on the PDSCH finally.

According to the method of cyclic redundancy check of some embodiments of the present disclosure, the sending-end device generates target CRC bits based on Information Bits carried in a part or all of at least one information field, so that the receiving-end device only checks the Information Bits carried in a part or all of at least one information field in a case that the receiving-end device checks control information, so as to avoid a case from occurring in which the receiving-end device considers that the transmitted control information is erroneous under a condition that there is no error in transmitted Information Bits in the control information but there is an error in transmitted Padding Bits, or avoid a case from occurring in which the receiving-end device considers that the transmitted control information is erroneous under a condition that there is an error in a part of transmitted Information Bits, but there is no error in a transmitted important Information Bit and the receiving-end device is capable of tolerating the error in the part of transmitted Information Bits, so as to improve the link performance of the communication system.

Figure 2:
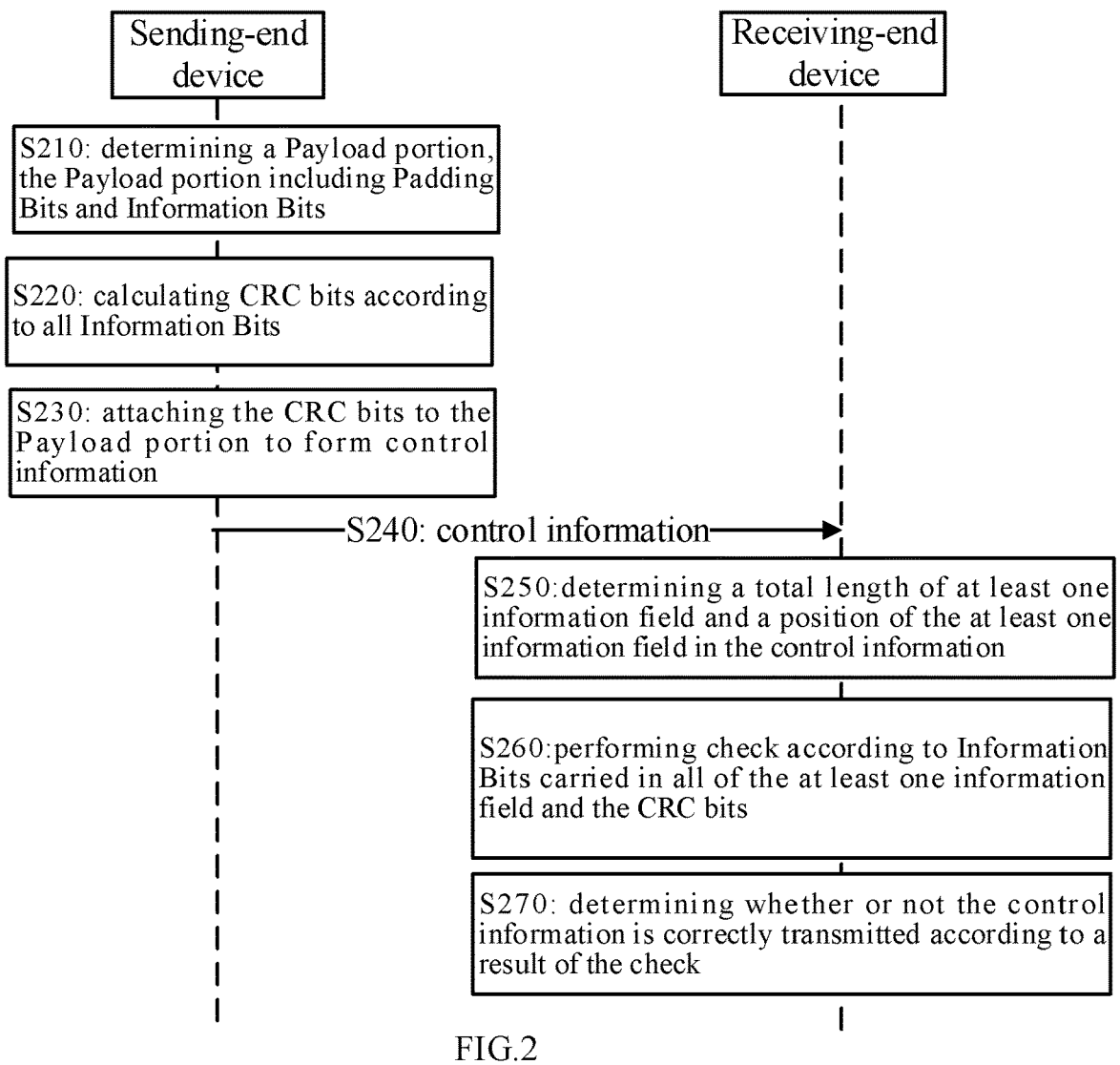
FIG. 2 is a second schematic flow chart of a method of cyclic redundancy check according to some embodiments of the present disclosure.

The method of cyclic redundancy check according to some embodiments of the present disclosure will be described below in conjunction with specific examples. FIG. 2 is a method of cyclic redundancy check according to some embodiments of the present disclosure. As shown in FIG. 2, the method 200 includes steps S210-S270.

S210: determining, by a sending-end device, that there are Padding Bits, and supplementing, by the sending-end device, the Padding Bits to Information Bits to be sent, to form a Payload portion.

Optionally, in S210, the Information Bits to be sent are carried in at least one information field, and the Padding Bits are carried in a padding field.

S220: calculating, by the sending-end device, CRC bits based on all of the Information Bits.

In particular, in some embodiments, the sending-end device determines, according to a Technical Specification of a protocol, that all of the Information Bits need to be taken as Input Bits for calculating CRC bits. Optionally, the sending-end device determines, according to agreement with the receiving-end device, that all of the Information Bits need to be used as Input Bits for calculating CRC bits. Optionally, the sending-end device decides, at a discretion of the sending-end device, to use all of the Information Bits as Input Bits for calculating CRC bits, in which case the sending-end device needs to send configuration information to the receiving-end device, so that the receiving-end device is informed by the configuration information that all of the Information Bits need to be taken as Input Bits in a case that the receiving-end device calculates the CRC bits. The sending-end device may send the configuration information to the receiving-end device by carrying the configuration in a higher-layer signaling.

S230: attaching, by the sending-end device, the CRC bits to the Payload portion to form the control information.

Figure 3:
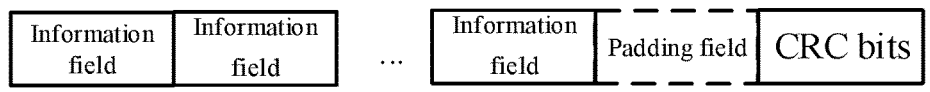
FIG. 3 is a first schematic diagram of positions of information fields, padding fields, and CRC bits in control information according to some embodiments of the present disclosure.
Figure 4:
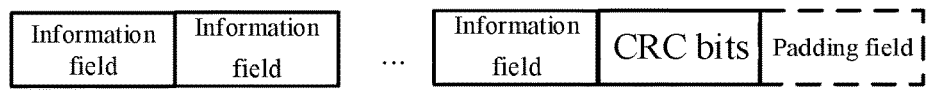
FIG. 4 is a second schematic diagram of positions of information fields, padding fields, and CRC bits in control information according to some embodiments of the present disclosure.

Optionally, as an example, positions of the CRC bits and the Payload portion in the control information are shown in FIG. 3 or FIG. 4. In FIG. 3, a position of the padding field is between a position of the at least one information field and a position of the CRC bits. In FIG. 4, the position of the CRC bits is between the position of the at least one information field and the position of the Padding Bits. In some embodiments of the present disclosure, the positions of the CRC bits and the Payload portion in the control information may be specified by a protocol, or may be previously agreed upon between the sending-end device and the receiving-end device, or may also be informed to the receiving-end device by the sending-end device through the configuration information.

Optionally, as an example, a first information field in the at least one information field is used to indicate a format of the control information. The receiving-end device parses the control information according to the format of the control information indicated by the first information field, and Information Bits carried in all information fields in the at least one information field can be obtained.

For example, different values of the first information field for indicating the format of the control information are used to indicate different formats. For example, assuming that there are four formats of the control information in a communication system, namely, a format AA, a format BB, a format CC, and a format DD, then the first information field used for indicating the format of the control information includes 2 bits, where "00" may be used to indicate that a format of the control information is the format AA, "01" may be used to indicate that the format of the control information is the format BB, "10" may be used to indicate that the format of the control information is the format CC, and "11" may be used to indicate that the format of the control information is the format DD.

Further, the format of the control information is used for the receiving-end device to determine a total length of the at least one information field. In particular, a length of the Payload and a length of the CRC bits may be known by pre-configuration or prior agreement. In order to facilitate the receiving-end device to know the total length of the at least one information field, a correspondence relation between the format of the control information and the total length of the at least one information field included in the control information may be specified by a protocol or configured by the sending-end device, the receiving-end device may determine the total length of the at least one information field included in the received control information, according to the format of the received control information and the above correspondence relation, thereby obtaining Information Bits carried in all of the at least one information field.

S240: sending control information by the sending-end device to the receiving-end device.

Optionally, the sending-end device may scramble the control information using a Radio Network Temporary Identity (RNTI), and send the scrambled control information to the receiving-end device.

S250: determining, by the receiving-end device, the total length of the at least one information field and a position of the at least one information field in the control information.

Specifically, in S250, the receiving-end device can acquire the Information Bits carried in all of the at least one information field according to the total length of the at least one information field and the position of the at least one information field in the control information.

Optionally, in some embodiments, the receiving-end device determines the format of the received control information, according to a field used to indicate the format of the control information in the at least one information field, and determines the total length of the at least one information field included in the received control information, according to the format of the received control information and the correspondence relation between the format of the control information and the total length of the at least one information field included in the control information.

Optionally, in other embodiments, the receiving-end device may determine the position of the at least one information field in the control information, according to a Technical Specification of a protocol. The receiving-end device may determine the position of the at least one information field in the control information, according to agreement between the receiving-end device and the sending-end device. The receiving-end device may also determine the position of the at least one information field in the control information, according to configuration information sent by the sending-end device.

S260: performing check by the receiving-end device according to the Information Bits carried in all of the at least one information field and the CRC bits.

It should be noted that performing check by the receiving-end device according to the Information Bits carried in all of the at least one information field and the CRC bits can be understood as: performing check on the control information by the receiving-end device according to the Information Bits carried in all of the at least one information field and the CRC bits, or can be understood as: performing check on all Information Bits of the control information by the receiving-end device according to Information Bits carried in all of the at least one information field and the CRC bits.

Optionally, in S260, the receiving-end device calculates CRC bits from the Information Bits carried in all of the at least one information field, and compares the calculated CRC bits with the CRC bits in the control information.

S270: determining, according to a result of the check, whether or not the control information is transmitted correctly.

Optionally, if the CRC bits calculated by the receiving-end device in S260 coincide with the CRC bits in the control information, the control information is considered to be sent correctly in S270; if the CRC bits calculated by the receiving-end device in S260 do not coincide with the CRC bits in the control information, the control information is considered to be sent incorrectly.

Figure 5:
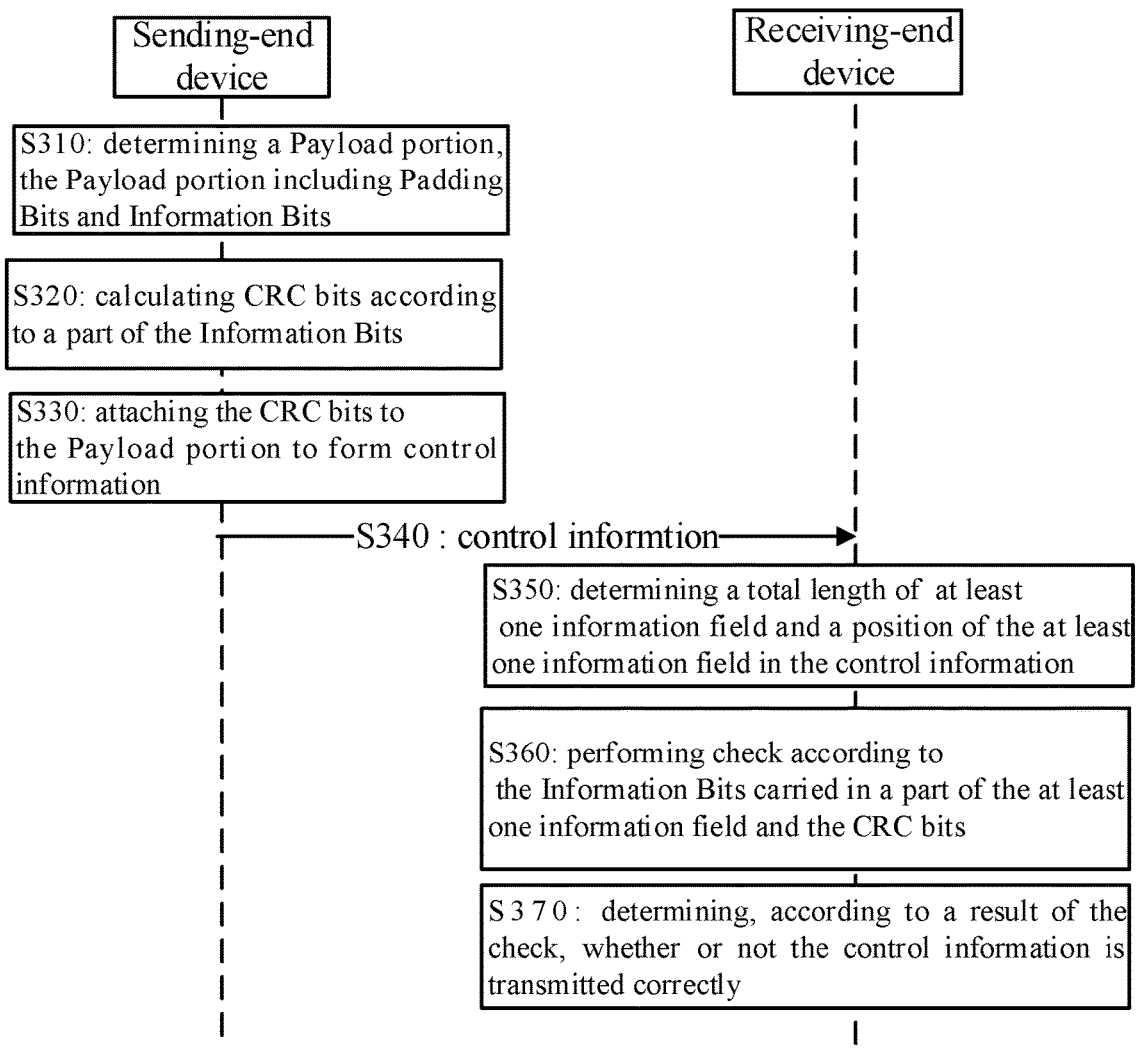
FIG. 5 is a third schematic flow chart of a method of cyclic redundancy check according to some embodiments of the present disclosure.

FIG. 5 is a schematic flow chart of a method of cyclic redundancy check according to some embodiments of the present disclosure. As shown in FIG. 5, the method 300 includes steps S310-S370.

S310: determining, by the sending-end device, that there are Padding Bits, and supplementing the Padding Bits by the sending-end device to the Information Bits to be sent, to form a Payload.

Optionally, in S310, the Information Bits to be sent are carried in at least one information field, and the Padding Bits are carried in a padding field.

S320: calculating CRC bits according to a part of the Information Bits by the sending-end device.

That is, in S320, the sending-end device calculates the CRC bits based on Information Bits carried in a part of the at least one information field.

In particular, in some embodiments, the sending-end device determines, according to a technical specification of a protocol, that a part of Information Bits need to be taken as Input Bits for calculating the CRC bits. Optionally, the sending-end device determines, according to agreement between the sending-end device and the receiving-end device, that a part of the Information Bits need to be taken as the Input Bits for calculating the CRC bits. Optionally, the sending-end device decides at a discretion of the sending-end device to use a part of the Information Bits as the Input Bits for calculating the CRC bits, in which case the sending-end device needs to send configuration information to the receiving-end device, and the receiving-end device is informed through the configuration information that the receiving-end device needs to use a part of the Information Bits as Input Bits for calculating the CRC bits. The sending-end device may send the configuration information to the receiving-end device through carrying the configuration information in a higher layer signaling.

Optionally, as an example, the sending-end device and the receiving-end device may agree in advance upon Information Bits carried in which information fields in the control information may be used to generate the CRC bits. Taking Uplink Control Information (UCI) as an example, it is assumed that the UCI includes a field carrying Acknowledgement (ACK)/Non-Acknowledgement (NACK) information, a field carrying an uplink Scheduling Request (SR), and a field carrying Channel State Information (CSI). The sending-end device and the receiving-end device may agree upon generating CRC bits according to Information Bits in the field carrying the ACK/NACK and the field carrying the SR.

Optionally, as another example, the sending-end device may inform, to receiving-end device through the configuration information, Information Bits carried in which fields need to be used to generate the CRC bits, that is, in a case that the configuration information indicates that the Input Bits include Information Bits carried in a part of the at least one information field, the configuration information is also used to indicate the part of the at least one information field. Taking the UCI described above as an example, the sending-end device may indicate through the configuration information that CRC bits need to be generated according to the Information Bits carried in the field carrying the ACK/NACK and the field carrying the SR.

S330: attaching, by the sending-end device, a CRC code to the Payload portion to form control information.

Figure 6:
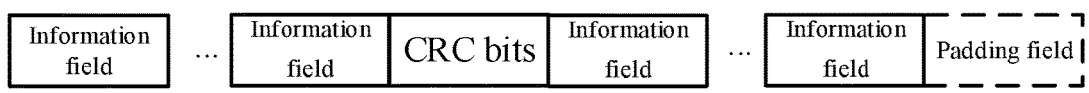
FIG. 6 is a third schematic diagram of positions of information fields, padding fields, and CRC bits in control information according to some embodiments of the present disclosure.

Optionally, as an example, positions of the CRC bits and the Payload portion in the control information are shown in FIG. 3. Optionally, the positions of the CRC bits and the Payload portion in the control information are shown in FIG. 6. In FIG. 6, the position of the CRC bits is subsequent to a position of the part of the at least one information field used to generate the CRC bits and before a position of an information field other than the part of the at least one information field, the padding field is at the end of the control information.

S340: sending control information to the receiving-end device by the sending-end device.

Optionally, the sending-end device may use the RNTI to scramble the control information, and send the scrambled control information to the receiving-end device.

S350: determining, by the receiving-end device, the total length of the at least one information field and the position of the at least one information field in the control information.

Specifically, in S350, the receiving-end device can acquire, based on the total length of the at least one information field and the position of the at least one information field in the control information, the Information Bits carried in all of the at least one information field. Further, the Information Bits carried in the part of the at least one information field are used as Input Bits for generating CRC bits.

S360: performing check by the receiving-end device according to the Information Bits carried in a part of the at least one information field and the CRC bits.

It should be noted that performing check by the receiving-end device according to the Information Bits carried in a part of the at least one information field and the CRC bits can be understood as: performing check on the control information by the receiving-end device according to the Information Bits carried in a part of the at least one information field and the CRC bits, or can be understood as: performing check on a part of Information Bits of the control information by the receiving-end device according to Information Bits carried in a part of the at least one information field and the CRC bits.

Optionally, in S360, the receiving-end device may determine the part of the at least one information field according to agreement between the receiving-end device and the sending-end device or according to a technical specification of a protocol. The receiving-end device may also determine the part of the at least one information field according to the configuration information of the sending-end device.

S370: determining, according to a result of the check, whether or not the control information is transmitted correctly.

In all of the embodiments described above, Information Bits carried in a second information field in the at least one information field are optionally predetermined bits (or fixed bits). The receiving-end device can determine, according to a transmission condition of the predetermined bits, whether or not the control information is valid, thereby determining whether or not the transmitted control information is a False Alarm, and can satisfy a requirement of the control information for the False Alarm. In this case, if the receiving-end device checks the control information successfully, the receiving-end device further determines the transmission condition of the predetermined bits, and if it is determined that the transmitted predetermined bits are correct, it is determined that the control information is valid, and the transmitted control information is not False Alarm; else if it is determined that the transmitted predetermined bits are incorrect, it is determined that the control information is invalid, and the transmitted control information is a False Alarm.

Figure 7:
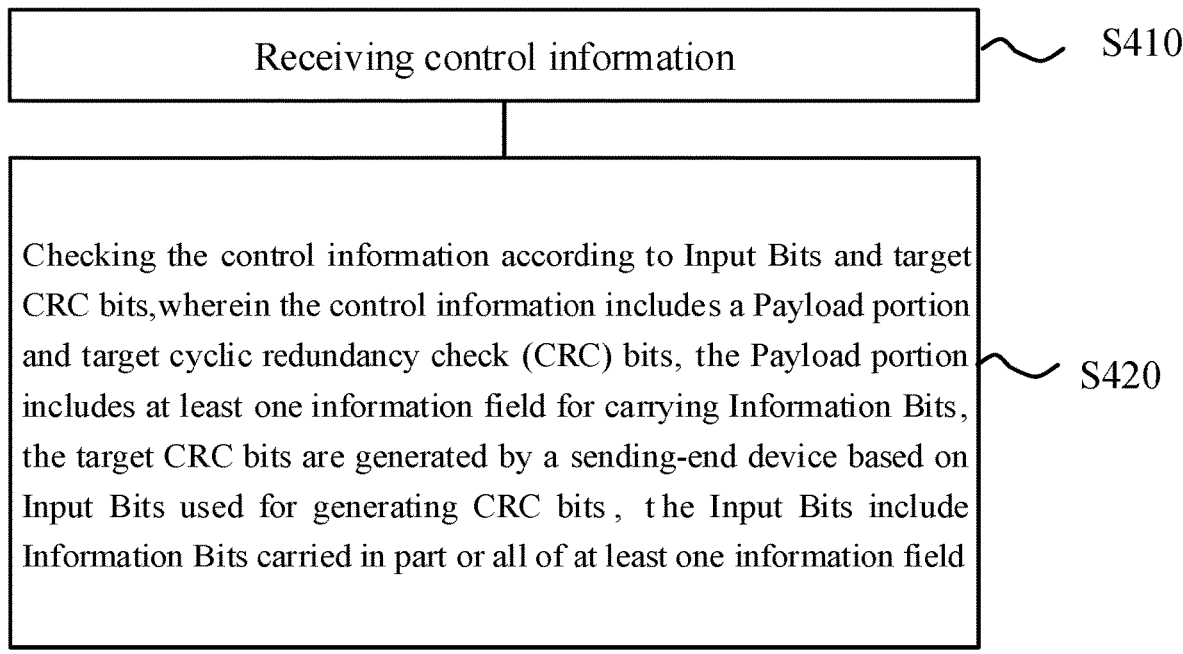
FIG. 7 is a fourth schematic flow chart of a method of cyclic redundancy check according to some embodiments of the present disclosure.

FIG. 7 illustrates a method of cyclic redundancy check 400 according to some embodiments of the present disclosure. The method 400 may be performed by a receiving-end device. It can be understood that description of interaction between the sending-end device and the receiving-end device from the receiving-end device side is the same as description of that from the sending-end device side, and related description is appropriately omitted in order to avoid repetition. As shown in FIG. 7, the method 400 includes steps S410-S420.

S410: receiving control information.

S420: checking the control information according to Input Bits and target CRC bits.

The control information includes a Payload portion and target cyclic redundancy check (CRC) bits. The Payload portion includes at least one information field for carrying Information Bits. The target CRC bits are generated by the sending-end device based on Input Bits used for generating CRC bits. The Input Bits include Information Bits carried in part or all of the at least one information field.

According to the method of cyclic redundancy check of some embodiments of the present disclosure, the CRC bits in the control information received by the receiving-end device are generated by the sending-end device according to Information Bits carried in part or all of the at least one information field. In a case that the receiving-end device checks the control information, the receiving-end device only checks the Information Bits carried in a part or all of at least one information field, so as to avoid a case from occurring in which the receiving-end device considers that the transmitted control information is incorrect under a condition that Information Bits in the control information are correctly transmitted but Padding Bits are incorrectly transmitted, or avoid a case from occurring in which the receiving-end device considers that transmitted control information is incorrectly transmitted under a condition that a part of the Information Bits are incorrectly transmitted but important Information Bits are correctly transmitted and the receiving-end device is capable of tolerating the part of the Information Bits incorrectly transmitted, thereby improving link performance of a communication system.

In some embodiments of the present disclosure, optionally, the Payload portion further includes a padding field for carrying Padding Bits; wherein the Input Bits include Information Bits carried in all of the at least one information field, a position of the padding field in the control information is between a position of the at least one information field and a position of the target CRC bits, or, the position of the target CRC bits in the control information is between the position of the at least one information field and the position of the padding field.

In some embodiments of the present disclosure, optionally, the Payload portion further includes a padding field for carrying the Padding Bits; wherein the Input Bits include Information Bits carried in a part of the at least one information field, the position of the padding field in the control information is between the position of the at least one information field and the position of the target CRC bits, or, the position of the target CRC bits in the control information is between the position of the part of the at least one information field and the position of an information field other than the part of the at least one information field, or is between the position of the part of the at least one information field and the padding field.

In some embodiments of the present disclosure, optionally, a first information field in the at least one information field is used to indicate a format of the control information; wherein the receiving-end device acquires the Input Bits according to the format of the control information before checking the control information according to the Input Bits and the target CRC bits.

Optionally, in some embodiments, the receiving-end device obtains the Input Bits by parsing the control information according to the format of the control information.

In some embodiments of the present disclosure, the format of the control information is optionally used by the receiving-end device to determine the total length of the at least one information field. The receiving-end device determines the total length of the at least one information field according to the format of the control information, and obtains the Input Bits according to the total length of the at least one information field.

In some embodiments of the present disclosure, optionally, Information Bits carried in the second information field in the at least one information field are predetermined bits. The predetermined bits are used for the receiving-end device to determine, according to a transmission condition of the predetermined bits, whether or not the control information is valid. If the receiving-end device checks the control information successfully, the receiving-end device determines whether the control information is valid according to the transmission condition of the predetermined bits. It is determined that the control information is valid if the transmitted predetermined bits are correct; it is determined that the control information is invalid if the transmitted predetermined bits are incorrect.

In some embodiments of the present disclosure, optionally, the receiving-end device receives configuration information sent by the sending-end device before the receiving-end device checks the control information according to the Input Bits and the target CRC bits. The configuration information is used to indicate that the Input Bits include Information Bits carried in a part or all of at least one information field. The receiving-end device obtains the Input Bits according to the configuration information.

In some embodiments of the present disclosure, optionally, in a case that the configuration information is used to indicate that the Input Bits include Information Bits carried in a part of the at least one information field, the configuration information is also used to indicate the part of the at least information field. The receiving-end device determines, according to the configuration information, Information Bits carried in which information fields of the at least one information field are used to generate the CRC bits.

Figure 8:
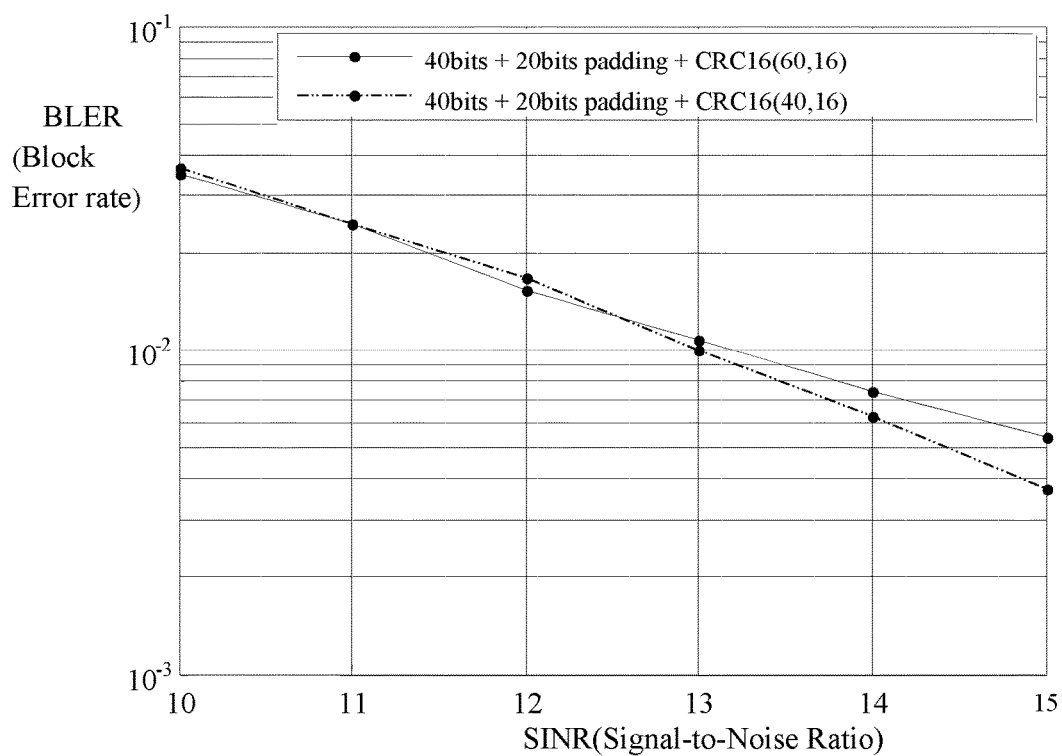
FIG. 8 is a comparison diagram comparing link performance of a method of cyclic redundancy check with link performance of a method of cyclic redundancy check in the related art according to some embodiments of the present disclosure.
Figure 9:
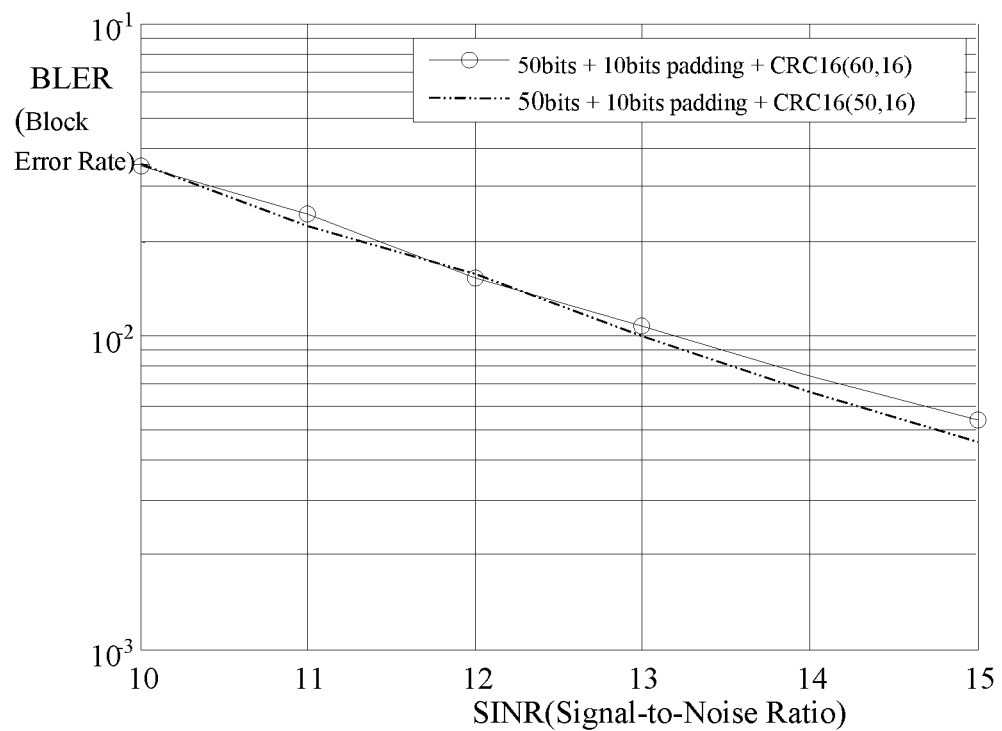
FIG. 9 is a comparison diagram comparing link performance of a method of cyclic redundancy check with link performance of a method of cyclic redundancy check in the related art according to some embodiments of the present disclosure.

FIGS. 8 and 9 illustrate link performance corresponding to a method of cyclic redundancy check according to some embodiments of the present disclosure and a method of cyclic redundancy check in the related art. Table 1 shows parameters used when a simulation of the performance is performed.

TABLE 1

| Parameter | Assumption |
|---|---|
| Bandwidth | 20 MHz |
| Channel model | 3 Km/h, TDL-C, 300 ns |
| Channel estimation | Ideal MMSE receiver, ideal SNR estimation |
| Resource allocation | Control information being mapped to an OFDM resource Each Resource Element Group (REG) frequency occupying a PRB resource |
| Control Channel Payload | 60-bit Payload, 16-bit CRC |
| Coding scheme | Polar code |
| Modulation Scheme | QPSK, Max-log-likehood algorithm |
| Subcarrier spacing | 15 kHz |
| Symbol length | Normal CP 160 Ts + 2048 Ts, Ts = 1/30.72 us |
| Antenna Model | 2 transmission antennas, 2 reception antennas |
| Transmission scheme and pilot | 1-port precoding cycle, a pilot occupying third, fourth, ninth and tenth subcarriers in a PRB, and the third, fourth, ninth and tenth subcarriers are scrambled by using an orthogonal code, OCC = [1 − 1]. |
| CCE size | 6 RBs, pilot overhead ⅓ |
| Aggregation level | 1 |

In FIG. 8, the number of Information Bits is 40, the number of Padding Bits is 20, a solid line with circles in FIG. 8 is a plot showing a relation between a block error rate and a signal-to-noise ratio obtained according to the method of some embodiments of the present disclosure, and a dashed line with circles is a plot showing a relation between a block error rate and a signal-to-noise ratio obtained according to the method in the related art. In FIG. 9, the number of Information Bits is 50, the number of Padding Bits is 10. A solid line with circles in FIG. 9 is a plot showing a relation between a block error rate and a signal-to-noise ratio obtained according to the method of some embodiments of the present disclosure, and a dashed line is a plot showing a relation between a block error rate and a signal-to-noise ratio obtained according to the method in the related art. It can be seen that the link performance using the method of cyclic redundancy check of some embodiments of the present disclosure is superior to a link gain using the cyclic check method in the related art. In particular, under a condition that the block error rate is required to be 1%, the method of some embodiments of the present disclosure has a link gain of about 0.25 dB relative to the method of the related art.

The method of cyclic redundancy check according to some embodiments of the present disclosure is described above in detail in connection with FIGS. 1 to 9. The sending-end device according to some embodiments of the present disclosure will be described below in detail in connection with FIG. 10.

Figure 10:
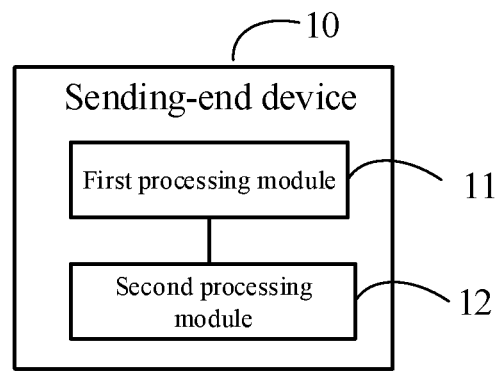
FIG. 10 is a first structural schematic diagram of a sending-end device according to some embodiments of the present disclosure.

FIG. 10 is a schematic structural diagram of a sending-end device according to some embodiments of the present disclosure. As shown in FIG. 10, the sending-end device 10 includes a first processing module 11 and a second processing module 12.

The first processing module 11 is used to determine a Payload portion, the Payload portion including at least one information field, the at least one information field being used for carrying Information Bits. The first processing module 11 is further used to determine Input Bits for generating cyclic redundancy check (CRC) bits, the Input Bits including Information Bits carried in a part or all of at least one information field.

The second processing module 12 is used to generate target CRC bits according to the Input Bits. The second processing module 12 is further used to generate control information including the Payload portion and the target CRC bits.

The sending-end device according to some embodiments of the present disclosure generates target CRC bits based on Information Bits carried in a part or all of at least one information field, so that the receiving-end device only checks the Information Bits carried in a part or all of at least one information field in a case that the receiving-end device checks control information, so as to avoid a case from occurring in which the receiving-end device considers that the transmitted control information is erroneous under a condition that there is no error in transmitted Information Bits in the control information but there is an error in transmitted Padding Bits, or avoid a case from occurring in which the receiving-end device considers that the transmitted control information is erroneous under a condition that there is an error in a part of transmitted Information Bits, but there is no error in transmitted important Information Bits and the receiving-end device is capable of tolerating the error in the part of the transmitted Information Bits, so as to improve the link performance of the communication system.

Optionally, as an example, the Payload portion further includes a padding field for carrying the Padding Bits; wherein the Input Bits include Information Bits carried in all of the at least one information field, the position of the padding field in the control information is between the position of the at least one information field and the position of the target CRC bits, or, the position of the target CRC bits in the control information is between the position of the at least one information field and the position of the padding field.

Optionally, as an example, the Payload portion further includes a padding field for carrying the Padding Bits; wherein the Input Bits include Information Bits carried in a part of the at least one information field, the position of the padding field in the control information is between the position of the at least one information field and the position of the target CRC bits, or, the position of the target CRC bits in the control information is between the position of the part of the at least one information field and the position of an information field other than the part of the at least one information field, or is between the position of the part of the at least one information field and the padding field.

Optionally, as an example, a first information field in the at least one information field is used to indicate a format of the control information.

Optionally, as an example, the format of the control information is used by the receiving-end device to determine a total length of the at least one information field.

Optionally, as an example, Information Bits carried in a second information field in the at least one information field are predetermined bits. The predetermined bits are used by the receiving-end device to determine, according to a transmission condition of the predetermined bits, whether or not the control information is valid.

Optionally, as an example, the first processing module 11 is further used to send configuration information to the receiving-end device. The configuration information is used to indicate that the Input Bits include Information Bits carried in a part or all of at least one information field.

Optionally, as an example, in a case that the configuration information indicates that the Input Bits include Information Bits carried in a part of the at least one information field, the configuration information is further used to indicate the part of the at least one information field.

Description of the sending-end device according to some embodiments of the present disclosure may be obtained by referring to flows of the methods 100 to 300 corresponding to some embodiments of the present disclosure. Each unit/module in the sending-end device and above-mentioned other operations and/or functions implement corresponding flows in the methods 100 to 300, respectively, and are not repeated herein for sake of brevity.

Figure 11:
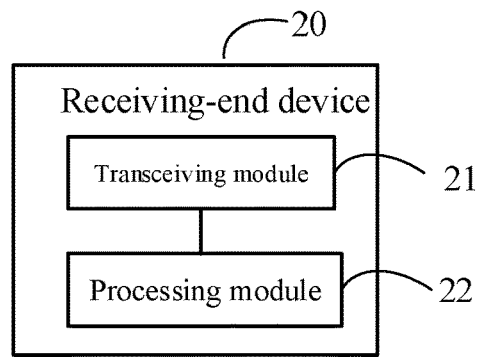
FIG. 11 is a first structural schematic diagram of a receiving-end device according to some embodiments of the present disclosure.

FIG. 11 is a schematic structural diagram of a receiving-end device according to some embodiments of the present disclosure. As shown in FIG. 11, the receiving-end device 20 includes a transceiving module 21 and a processing module 22.

The transceiving module 21 is used to receive control information. The processing module 22 is used to check the control information according to Input Bits and target CRC bits.

The control information includes a Payload portion and target cyclic redundancy check (CRC) bits. The Payload portion includes at least one information field for carrying Information Bits. The target CRC bits are generated by the sending-end device based on Input Bits used for generating CRC bits. The Input Bits include Information Bits carried in a part or all of at least one information field.

The CRC bits in the control information received by the receiving-end device according to some embodiments of the present disclosure are generated by the sending-end device according to Information Bits carried in a part or all of at least one information field. In a case that the receiving-end device checks the control information, the receiving-end device only checks the Information Bits carried in a part or all of at least one information field, so as to avoid a case from occurring in which the receiving-end device considers that the transmitted control information is incorrect under a condition that Information Bits in the control information are correctly transmitted but Padding Bits are incorrectly transmitted, or avoid a case from occurring in which the receiving-end device considers that transmitted control information is incorrectly transmitted under a condition that a part of the Information Bits are incorrectly transmitted but important Information Bits are correctly transmitted and the receiving-end device is capable of tolerating the part of the Information Bits incorrectly transmitted, thereby improving link performance of a communication system.

Optionally, as an example, the Payload portion further includes a padding field for carrying Padding Bits; wherein the Input Bits include Information Bits carried in all of the at least one information field, a position of the padding field in the control information is between a position of the at least one information field and a position of the target CRC bits, or, the position of the target CRC bits in the control information is between the position of the at least one information field and the position of the padding field.

Optionally, as an example, the Payload portion further includes a padding field for carrying the Padding Bits; wherein the Input Bits include Information Bits carried in a part of the at least one information field, the position of the padding field in the control information is between the position of the at least one information field and the position of the target CRC bits, or, the position of the target CRC bits in the control information is between the position of the part of the at least one information field and the positions of an information field other than the part of the at least one information field, or is between the position of the part of the at least one information field and the padding field.

Optionally, as an example, a first information field in the at least one information field is used to indicate a format of the control information; wherein the processing module 22 is further used to acquire the Input Bits according to the format of the control information.

Optionally, as an example, the format of the control information is used by the receiving-end device to determine the total length of the at least one information field. The processing module 22 is specifically used to determine the total length of the at least one information field according to the format of the control information, and obtain the Input Bits according to the total length of the at least one information field.

Optionally, as an example, Information Bits carried in the second information field in the at least one information field are predetermined bits. The predetermined bits are used for the receiving-end device to determine, according to a transmission condition of the predetermined bits, whether or not the control information is valid. The processing module 22 is further used to: if the control information is checked successfully, determine whether or not the control information is valid according to the transmission condition of the predetermined bits; wherein the control information is determined to be valid if the transmitted predetermined bits are correct; the control information is determined to be invalid if the transmitted predetermined bits are incorrect.

Optionally, as an example, the transceiving module 21 is further used to receive configuration information sent by the sending-end device. The configuration information is used to indicate that the Input Bits include Information Bits carried in a part or all of at least one information field. The processing module 22 is further used to obtain the Input Bits according to the configuration information.

Optionally, as an example, in a case that the configuration information is used to indicate that the Input Bits include Information Bits carried in a part of the at least one information field, the configuration information is also used to indicate the part of the at least information field.

Description of the receiving-end device according to some embodiments of the present disclosure may be obtained by referring to flows of the methods 200 to 400 corresponding to some embodiments of the present disclosure. Each unit/module in the receiving-end device and above-mentioned other operations and/or functions implement the corresponding flows in the methods 200 to 400, and are not repeated here for sake of brevity.

Figure 12:
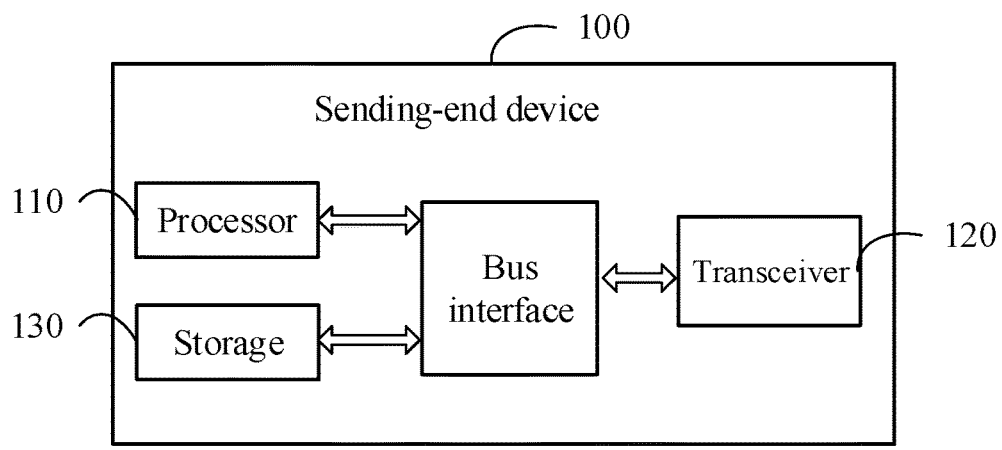
FIG. 12 is a second schematic structural diagram of a sending-end device according to some embodiments of the present disclosure.

FIG. 12 shows a schematic structural diagram of a sending-end device according to some embodiments of the present disclosure. The sending-end device shown in FIG. 12 may achieve details of methods of cyclic redundancy check in the methods 100 to 300, and the same effect can be achieved. As shown in FIG. 12, the sending-end device 100 includes a processor 110, a transceiver 120, a storage 130, and a bus interface. In some embodiments of the present disclosure, the sending-end device 100 further includes a computer program stored on the storage 130 and executable by the processor 110. In a case that the computer program is executed by the processor 110, the processor 110 performs following steps: determining a Payload portion, the Payload portion including at least one information field, the at least one information field being used for carrying Information Bits; determining Input Bits for generating cyclic redundancy check (CRC) bits, the Input Bits including Information Bits carried in a part or all of at least one information field; generating target CRC bits according to the Input Bits; and generating control information including the Payload portion and the target CRC bits.

In FIG. 12, a bus architecture may include any number of interconnected buses and bridges. Specifically, various circuits including one or more processors represented by the processor 110 and a storage represented by the storage 130 are linked together by the bus architecture. The bus architecture may also link together a variety of other circuits, such as peripherals, regulators, and power management circuits, which are well known in the art and, therefore, will not be described further herein. A bus interface provides an interface. The transceiver 120 may be a plurality of elements, including a transmitter and a receiver, for providing means for communicating with various other devices over a transmission medium.

The processor 110 is responsible for managing the bus architecture and general processing, and the storage 130 may store data used by the processor 110 when the processor 110 performs operations.

Optionally, in a case that the computer program is executed by the processor 110, the processor 110 performs following steps: sending configuration information to the receiving-end device. The configuration information is used to indicate that the Input Bits include Information Bits carried in a part or all of at least one information field.

Optionally, as an example, the Payload portion further includes a padding field for carrying the Padding Bits; wherein the Input Bits include Information Bits carried in all of the at least one information field, the position of the padding field in the control information is between the position of the at least one information field and the position of the target CRC bits, or, the position of the target CRC bits in the control information is between the position of the at least one information field and the position of the padding field.

Optionally, as an example, the Payload portion further includes a padding field for carrying the Padding Bits; wherein the Input Bits include Information Bits carried in a part of the at least one information field, the position of the padding field in the control information is between the position of the at least one information field and the position of the target CRC bits, or, the position of the target CRC bits in the control information is between the position of the part of the at least one information field and the position of an information field other than the part of the at least one information field, or is between the position of the part of the at least one information field and the padding field.

Optionally, as an example, a first information field in the at least one information field is used to indicate a format of the control information.

Optionally, as an example, the format of the control information is used by the receiving-end device to determine a total length of the at least one information field.

Optionally, as an example, Information Bits carried in a second information field in the at least one information field are predetermined bits. The predetermined bits are used by the receiving-end device to determine, according to a transmission condition of the predetermined bits, whether or not the control information is valid.

Optionally, as an example, in a case that the configuration information indicates that the Input Bits include Information Bits carried in a part of the at least one information field, the configuration information is further used to indicate the part of the at least one information field.

The sending-end device according to some embodiments of the present disclosure generates target CRC bits based on Information Bits carried in a part or all of at least one information field, so that the receiving-end device only checks the Information Bits carried in a part or all of at least one information field in a case that the receiving-end device checks control information, so as to avoid a case from occurring in which the receiving-end device considers that the transmitted control information is erroneous under a condition that there is no error in transmitted Information Bits in the control information but there is an error in transmitted Padding Bits, or avoid a case from occurring in which the receiving-end device considers that the transmitted control information is erroneous under a condition that there is an error in a part of transmitted Information Bits, but there is no error in transmitted important Information Bits and the receiving-end device is capable of tolerating the error in the part of the transmitted Information Bits, so as to improve the link performance of the communication system.

Description of the sending-end device 100 according to some embodiments of the present disclosure may be obtained by referring to the sending-end device 10 in some embodiments of the present disclosure. Each unit/module in the sending-end device and above-mentioned other operations and/or functions implement corresponding flows in the methods 100 to 300, respectively, and are not repeated herein for sake of brevity.

Figure 13:
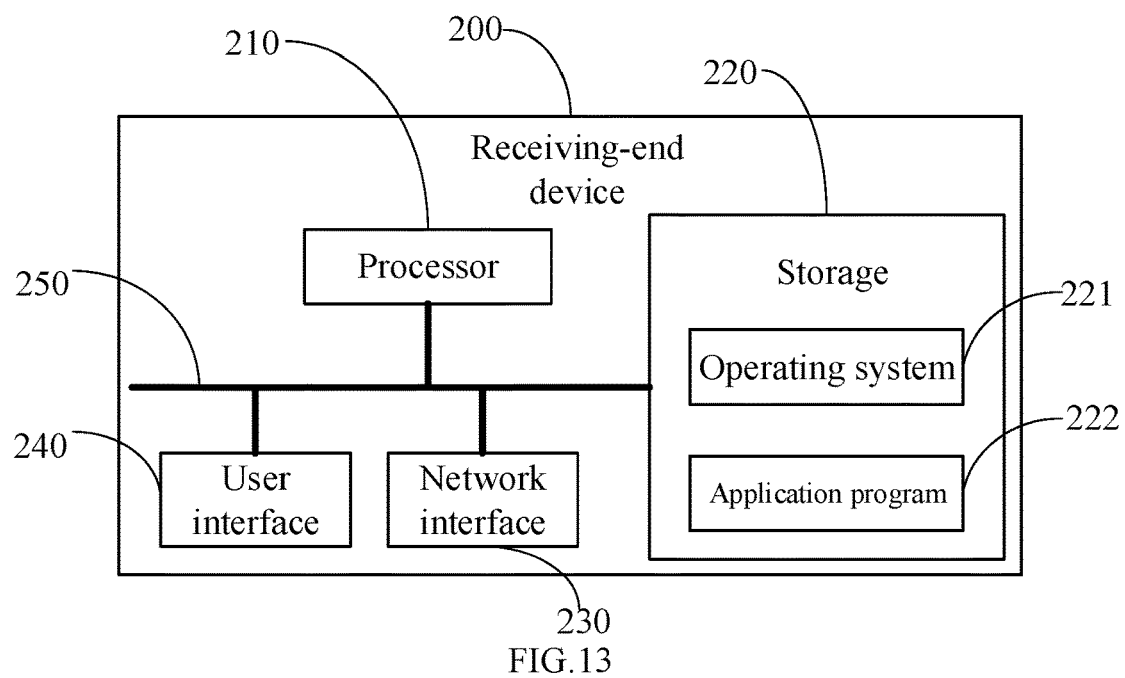
FIG. 13 is a second schematic structural diagram of a receiving-end device according to some embodiments of the present disclosure.

FIG. 13 shows a schematic structural diagram of a receiving-end device according to some embodiments of the present disclosure. As shown in FIG. 13, the receiving-end device 200 includes at least one processor 210, a storage 220, at least one network interface 230 and a user interface 240. Various components in the receiving-end device 200 are coupled together by a bus system 250. It will be appreciated that the bus system 250 is used to enable connection communication among these components. The bus system 250 includes a data bus, a power bus, a control bus, and a status signal bus. However, for clarity of illustration, various buses are designated as the bus system 250 in FIG. 13.

The user interface 240 may include a display, a keyboard, or a pointing device (e.g., a mouse, a trackball, a touch pad, or a touch screen, etc.).

It will be appreciated that the storage 220 in some embodiments of the present disclosure may be a volatile storage or a non-volatile storage, or may include both the volatile storage and the non-volatile storage. The non-volatile storage may be a Read-Only Memory (ROM), a Programmable ROM (PROM), an Erasable Programmable Read Only Memory (EPROM), an Electrically Erasable Programmable Read Only Memory (EEPROM), or a Flash Memory. The volatile storage may be a Random Access Memory (RAM), which serves as an external cache. By way of example, but not by way of limitation, many forms of RAMs may be used, such as a Static Random Access Memory (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a DirectRambus RAM (DRRAM). The storage 220 of the systems and methods described by some embodiments of the present disclosure is intended to include, but is not limited to, these and any other suitable types of memories.

In some embodiments, the storage 220 stores following elements, executable modules or data structures, or a subset thereof, or an extension set thereof: an operating system 221 and an application program 222.

The operating system 221 includes various system programs, such as a framework layer, a core library layer, and a driver layer, for implementing various basic services and processing hardware-based tasks. The application program 222 includes various application programs, such as a Media Player, a Browser, and the like, for implementing various application services. Programs implementing the methods of some embodiments of the present disclosure may be included in the application program 222.

In some embodiments of the present disclosure, the receiving-end device 200 further includes a computer program stored on the storage 220 and executable by the processor 210. In a case that the computer program is executed by the processor 210, the processor 210 performs following steps: receiving control information; checking the control information according to Input Bits and target CRC bits; wherein the control information includes a Payload portion and target cyclic redundancy check (CRC) bits, the Payload portion includes at least one information field for carrying Information Bits, the target CRC bits are generated by the sending-end device based on Input Bits used for generating CRC bits, and the Input Bits include Information Bits carried in a part or all of at least one information field.

The methods disclosed by some embodiments of the present disclosure described above may be applied to, or implemented by, the processor 210. The processor 210 may be an integrated circuit chip with signal processing capability. In implementation, the steps of the methods described above may be accomplished by integrated logic circuitry of hardware in the processor 210 or instructions in a form of software. The processor 210 may be a general-purpose processor, a Digital Signal Processor (DSP), an Application Specific Integrated Circuit (ASIC), a Field Programmable Gate Array (FPGA) or other programmable logic devices, discrete gates or transistor logic devices, discrete hardware components. The methods, steps, and logic blocks disclosed in some embodiments of the present disclosure may be implemented or performed. The general purpose processor may be a microprocessor or the processor may be any conventional processor or the like. The steps of the methods disclosed in connection with some embodiments of the present disclosure may be implemented directly as execution by a hardware decoding processor, or as a combination of hardware and software modules in a decoding processor. A software module may be located in a computer readable storage medium mature in the art, such as a random access memory, a flash memory, a read only memory, a programmable read only memory, or an electrically erasable programmable memory, a register, etc. The computer readable storage medium is located in the storage 220, and the processor 210 reads information in the storage 220 and performs the steps of the method described above in conjunction with hardware of the processor 210. In particular, the computer readable storage medium has stored thereon a computer program, wherein in a case that the computer program is executed by the processor 210, the processor 210 implements various steps of the embodiments of the methods 200-400 described above.

It will be appreciated that the embodiments described in the present disclosure may be implemented in hardware, software, firmware, middleware, a microcode, or a combination thereof. For hardware implementation, a processing unit may be implemented in one or more of an Application Specific Integrated Circuit (ASIC), a Digital Signal Processor (DSP), a DSP Device (DSPD), a Programmable Logic Device (PLD), a Field-Programmable Gate Array (FPGA), a general purpose processor, a controller, a microcontroller, a microprocessor, other electronic units for performing the functions described in the present disclosure, or a combination thereof.

For software implementation, techniques described in some embodiments of the present disclosure may be implemented by modules (e.g., processes, functions, etc.) that perform the functions described in some embodiments of the disclosure. A software code may be stored in a storage and executed by a processor. The storage may be implemented in the processor or external to the processor.

Optionally, in a case that the computer program is executed by the processor 210, the processor 210 may further implement followings steps: receiving configuration information sent by the sending-end device, wherein the configuration information is used to indicate that the Input Bits include Information Bits carried in a part or all of at least one information field; and obtaining the Input Bits according to the configuration information.

Optionally, as an example, the Payload portion further includes a padding field for carrying Padding Bits; wherein the Input Bits include Information Bits carried in all of the at least one information field, a position of the padding field in the control information is between a position of the at least one information field and a position of the target CRC bits, or, the position of the target CRC bits in the control information is between the position of the at least one information field and the position of the padding field.

Optionally, as an example, the Payload portion further includes a padding field for carrying the Padding Bits; wherein the Input Bits include Information Bits carried in a part of the at least one information field, the position of the padding field in the control information is between the position of the at least one information field and the position of the target CRC bits, or, the position of the target CRC bits in the control information is between the position of the part of the at least one information field and the position of an information field other than the part of the at least one information field, or is between the position of the part of the at least one information field and the padding field.

Optionally, as an example, the format of the control information is used by the receiving-end device to determine the total length of the at least one information field, wherein in a case that the computer program is executed by the processor 210, the processor 210 further implements a following step: acquiring the Input Bits according to the format of the control information.

Optionally, as an example, the format of the control information is used for the receiving-end device to determine the total length of the at least one information field; wherein, in a case that the computer program is executed by the processor 210, the processor 210 further implements following steps: determining the total length of the at least one information field according to the format of the control information, and obtaining the Input Bits according to the total length of the at least one information field.

Optionally, as an example, Information Bits carried in the second information field in the at least one information field are predetermined bits; the predetermined bits are used for the receiving-end device to determine, according to a transmission condition of the predetermined bits, whether or not the control information is valid, wherein in a case that the processor 210 is executed by the processor 210, the processor 210 further implements the following steps: if the control information is checked successfully, determining whether or not the control information is valid according to the transmission condition of the predetermined bits; wherein the control information is determined to be valid if the transmitted predetermined bits are correct; the control information is determined to be invalid if the transmitted predetermined bits are incorrect.

Optionally, as an example, in a case that the configuration information is used to indicate that the Input Bits include Information Bits carried in a part of the at least one information field, the configuration information is also used to indicate the part of the at least information field.

The CRC bits in the control information received by the receiving-end device according to some embodiments of the present disclosure are generated by the sending-end device according to Information Bits carried in a part or all of at least one information field. In a case that the receiving-end device checks the control information, the receiving-end device only checks the Information Bits carried in a part or all of at least one information field, so as to avoid a case from occurring in which the receiving-end device considers that the transmitted control information is incorrect under a condition that Information Bits in the control information are correctly transmitted but Padding Bits are incorrectly transmitted, or avoid a case from occurring in which the receiving-end device considers that transmitted control information is incorrectly transmitted under a condition that a part of the Information Bits are incorrectly transmitted but important Information Bits are correctly transmitted and the receiving-end device is capable of tolerating the part of the Information Bits incorrectly transmitted, thereby improving link performance of a communication system.

Description of the receiving-end device 200 according to some embodiments of the present disclosure may be obtained by referring to the receiving device 20 corresponding to some embodiments of the present disclosure. Each unit/module in the receiving-end device and above-mentioned other operations and/or functions implement corresponding flows in the methods 200 to 400, respectively, and are not repeated herein for sake of brevity.

In the above embodiments of the present disclosure, the sending-end device generates CRC bits based on a part or all of Information Bits in the control information. In a case that the receiving-end device checks the control information, the receiving-end device only checks a part or all of the Information Bits in the control information. Thus, the method of the embodiments of the present disclosure avoids a case from occurring in which the receiving-end device considers that the transmitted control information is incorrect under a condition that Information Bits are correctly transmitted but Padding Bits are incorrectly transmitted, or avoids a case from occurring in which the receiving-end device considers that transmitted control information is incorrectly transmitted under a condition that a part of the Information Bits are incorrectly transmitted but important Information Bits are correctly transmitted and the receiving-end device is capable of tolerating the part of the Information Bits incorrectly transmitted, and thus link performance of a communication system is improved.

Other examples of methods of cyclic redundancy check of some embodiments of the present disclosure are provided below. The method of cyclic redundancy check and the device of cyclic redundancy check provided by the following embodiments of the present disclosure can solve the problem of poor reception performance when receiving control information.

Figure 14:
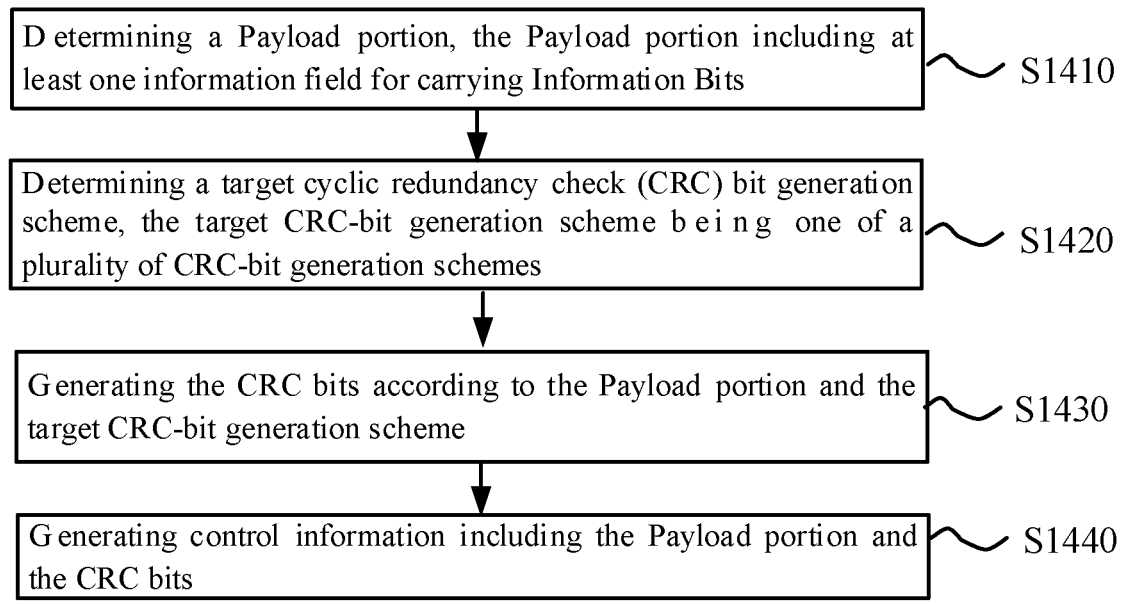
FIG. 14 is a fifth schematic flow chart of a method of cyclic redundancy check according to some embodiments of the present disclosure.

FIG. 14 illustrates a method of cyclic redundancy check 1400 according to some embodiments of the present disclosure. The method of cyclic redundancy check 1400 is performed by a sending-end device. As shown in FIG. 14, the method 1400 includes steps S1410-S1440.

S1410: determining a Payload portion, the Payload portion including at least one information field for carrying Information Bits.

Optionally, there may be multiple control information with different formats in a New Radio (NR) system, and sizes of the control information with different formats may vary. If the receiving-end device is required to blindly detect the formats of the control information, the receiving-end device may be caused to have high complexity, and therefore, in some embodiments of the present disclosure, the control information with different formats may be aligned by adding Padding Bits at a tail of a piece of control information having a short length, to reduce the complexity of the receiving-end device, wherein, the Padding Bits are usually "0".

Specifically, in some embodiments, the sending-end device determines, according to a format of control information to be generated, whether or not there are the Padding Bits, and if there are the Padding Bits, then the Payload portion further includes a padding field. The padding field is used to carry the Padding Bits.

S1420: determining a target cyclic redundancy check (CRC) bit generation scheme, the generation scheme of target CRC bits being one of a plurality of generation schemes of CRC bits.

It should also be noted that in some embodiments of the present disclosure, Cyclic Redundancy Check (CRC) bits may also be referred to as a "CRC code". Difference among different generation schemes of CRC bits is difference in Input Bits for a process of generating the CRC bits.

Optionally, as an example, the plurality of generation schemes of CRC bits include at least two of following schemes: using Information Bits carried in all of the at least one information field as Input Bits for a process of generating the CRC bits; using Information Bits carried in a part of the at least one information field as Input Bits for the process of generating the CRC bits; using all bits carried in the Payload portion as Input Bits for the process of generating the CRC bits.

Optionally, for the generation scheme of CRC bits in which Information Bits carried in a part of the at least one information field are used as Input Bits in the process of the generating CRC bits, the sending-end device and the receiving-end device may agree in advance Information Bits carried in which the information fields in the control information are used as Input Bits in the process of generating CRC bits, or the sending-end device may inform, Information Bits carried which fields need to be used as Input Bits in the process of generating CRC bits, to the receiving-end device through the configuration information.

Taking Uplink Control Information (UCI) as an example, it is assumed that the UCI includes a field carrying Acknowledgement (ACK)/Non-Acknowledgement (NACK) information, a field carrying an uplink Scheduling Request (SR), and a field carrying Channel State Information (CSI). The sending-end device and the receiving-end device may agree upon using Information Bits carried in the field carrying the ACK/NACK information and the field carrying the SR as Input Bits in the process of generating CRC bits. Optionally, the sending-end device may indicate, to the receiving-end device through the configuration information, that Information Bits carried in the field carrying the ACK/NACK and the field carrying the SR need to be used as the Input Bits for the process of generating the CRC bits.

It will be appreciated that using the Information Bits carried in all of the at least one information field as the Input Bits for the process of generating the CRC bits, or using the Information Bits carried in a part of the at least one information field as the Input Bits for the process of generating the CRC bits, may avoid a case from occurring in which the receiving-end device considers that the transmitted control information is incorrect under a condition that the transmitted Information Bits in the control information is correct but the transmitted Padding Bits are incorrect, as compared to a case in the related art in which all bits carried by the entirety of the Payload portion are used as Input Bits in the process of generating CRC bits, thereby enhancing link performance of a communication system.

In some embodiments of the present disclosure, optionally, the sending-end device determines, according to the format of the control information, a generation scheme of target CRC bits; and/or the sending-end device determines, according to the type of a Radio Network Temporary Identity used for scrambling the control information, the generation scheme of target CRC bits.

S1430: generating the CRC bits according to the Payload portion and the generation scheme of target CRC bits.

In particular, in S1430, the sending-end device determines, accord to the generation scheme of target CRC bits, using all bits carried in the Payload portion as Input Bits for the process of generating the CRC bits, and generates the CRC bits based on the determined bits used as the Input Bits.

S1440: generating control information including the Payload portion and the CRC bits.

Optionally, in S1410, the Payload portion further includes a padding field, and a position of the CRC bits and a position of the Payload portion in the control information are shown in FIG. 3 or FIG. 4. In FIG. 3, the position of the padding field is between the position of the at least one information field and the position of the CRC bits. In FIG. 4, the position of the CRC bits is between the position of the at least one information field and the position of the padding field. In some embodiments of the present disclosure, the positions of the CRC bits and the Payload portion in the control information may be specified by a protocol, or may be previously agreed upon between the sending-end device and the receiving-end device, or may also informed to the receiving-end device through the configuration information by the sending-end device.

Optionally, as an example, one of the at least one information field included in the Payload portion of the control information is used to indicate the format of the control information. The receiving-end device parses the control information according to the format of the control information indicated by this information field, and all bits carried in the Payload portion can be acquired.

For example, different values of the information field for indicating the format of the control information are used to indicate different formats. For example, assuming that there are four formats of the control information in a communication system, namely, a format AA, a format BB, a format CC, and a format DD, then the information field used for indicating the format of the control information includes 2 bits, where "00" may be used to indicate that a format of the control information is the format AA, "01" may be used to indicate that the format of the control information is the format BB, "10" may be used to indicate that the format of the control information is the format CC, and "11" may be used to indicate that the format of the control information is the format DD.

Further, the length of the Payload and the length of the CRC bits may be known by pre-configuration or by prior agreement, in order to facilitate the receiving-end device to know the total length of the at least one information field. A correspondence relation between the format of the control information and the total length of the at least one information field included in the control information may be specified by a protocol or configured by the sending-end device, the receiving-end device may determine the total length of the at least one information field included in the received control information, according to the format of the received control information and the above correspondence relation, thereby obtaining Information Bits carried in all of the at least one information field.

Optionally, as another example, Information Bits carried in one of the at least one information field are optionally predetermined bits (or fixed bits). The receiving-end device can determine, according to a transmission condition of the predetermined bits, whether or not the control information is valid, thereby determining whether or not the transmitted control information is a False Alarm, and can satisfy a requirement of the control information for the False Alarm. In this case, if the receiving-end device checks the control information successfully, the receiving-end device further determines the transmission condition of the predetermined bits, and if it is determined that the transmitted predetermined bits are correct, it is determined that the control information is valid, and the transmitted control information is not False Alarm; else if it is determined that the transmitted predetermined bits are incorrect, it is determined that the control information is invalid, and the transmitted control information is a False Alarm.

Figure 15:
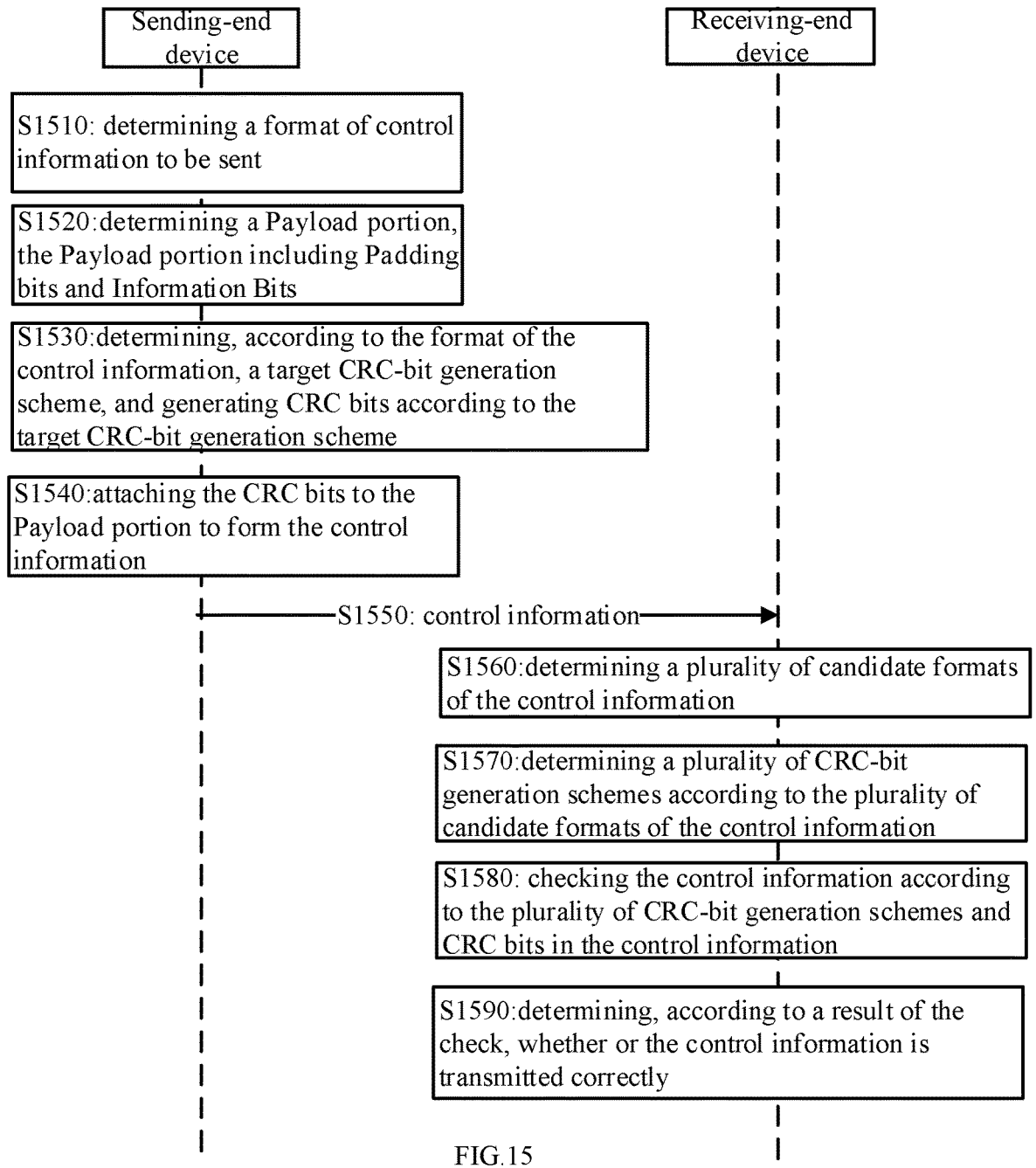
FIG. 15 is a sixth schematic flow chart of a method of cyclic redundancy check according to some embodiments of the present disclosure.

A method of cyclic redundancy check according to some embodiments of the present disclosure will be described below in conjunction with specific examples. FIG. 15 is a method of cyclic redundancy check according to some embodiments of the present disclosure, and as shown in FIG. 15, a method 1500 includes steps S1510-S1590.

S1510: determining, by the sending-end device, a format of control information to be sent.

Optionally, as an example, the control information is downlink control information (DCI), and the format of the control information is one of following formats: "0", "1", "1A", "1B", "1C", "1D", "2", "2A", "2B", "3", "3A".

S1520: determining, by the sending-end device, that there are Padding Bits, and supplementing, by the sending-end device, the Padding Bits to the Information Bits to be sent, to form a Payload.

S1530: determining, by the sending-end device according to the format of the control information, a generation scheme of target CRC bits, and generating CRC bits according to the generation scheme of target CRC bits.

Optionally, the generation scheme of target CRC bits is one of a plurality of generation schemes of CRC bits described in the method 1400.

Optionally, the sending-end device selects different generation schemes of CRC bits for control information with different formats and having the same length of the Payload portion. Taking the DCI as an example, in order to reduce the complexity of blind detection at the receiving-end device, the Payload portion of the DCI with the format of "1A" and the Payload portion of the DCI with the format of "0" may have the same size, but different contents. The DCI with the format of "1A" is used for scheduling downlink data, and is not sensitive to the False Alarm, while the DCI with the format of "0" is used for scheduling uplink data, and is sensitive to the False Alarm. Therefore, in a case that the format of the DCI is "1A", the generation scheme of target CRC bits determined by the sending-end device is to use Information Bits carried in all of the at least one information field as Input Bits for the process of generating the CRC bits, or use Information Bits carried in a part of the at least one information field as Input Bits in the process of generating CRC bits. In a case that the format of DCI is "0," the generation scheme of target CRC bits determined by the sending-end device is to use all bits carried in the Payload portion as Input Bits for the process of generating the CRC bits.

S1540: attaching the CRC bits to the Payload portion to form the control information.

Optionally, the Information Bits in the control information generated in S1540 are carried in at least one information field, the Padding Bits are carried in the padding field. Positions of at least one information field, the padding fields and the CRC bits in the control information are shown in FIGS. 3 and 4.

S1550: sending control information to the receiving-end device by the sending-end device.

Optionally, in S1550, if the control information is the DCI, the sending-end device is a network device, the receiving-end device is a terminal device, the network device transmits the DCI to the terminal device on a Physical Downlink Control Channel (PDCCH). If the control information is the UCI, the sending-end is a terminal device, the receiving-end device is a network device, the terminal device transmits the UCI to the network device on a Physical Uplink Control Channel (PUCCH).

S1560: determining a plurality of candidate formats of the control information by the receiving-end device.

Specifically, in S1560, the receiving-end device determines a plurality of candidate formats of the control information according to a technical specification of a protocol, or the receiving-end device determines a plurality of candidate formats of the control information according to the configuration information of the sending-end device.

S1570: determining a plurality of generation schemes of CRC bits according to the plurality of candidate formats of the control information by the receiving-end device.

Optionally, each of the plurality of candidate formats of the control information corresponds to a generation scheme of CRC bits, or several candidate formats correspond to the same generation scheme of CRC bits. A correspondence relation between the candidate formats and the generation schemes of CRC bits may be specified by the protocol, or may be configured by the sending-end device through configuration information.

S1580: checking the control information by the receiving-end device according to the plurality of generation schemes of CRC bits and CRC bits in the control information.

Optionally, in S1580, the receiving-end device calculates CRC bits according to each of a plurality of generation schemes of CRC bits, and compares the calculated plurality of types of CRC bits with the CRC bits in the control information; if the calculated plurality of types of CRC bits include the same CRC bits as the CRC bits in the control information, check of the control information check is successful, otherwise, the check of the control information is failed.

S1590: determining, according to a result of the check, whether or the control information is transmitted correctly.

Specifically, if the check of the control information is successful in S1580, the control information is considered to be correctly transmitted in S1590. If the check of the control information is failed in S1580, the control information is considered to be incorrectly transmitted in S1590.

Figure 16:
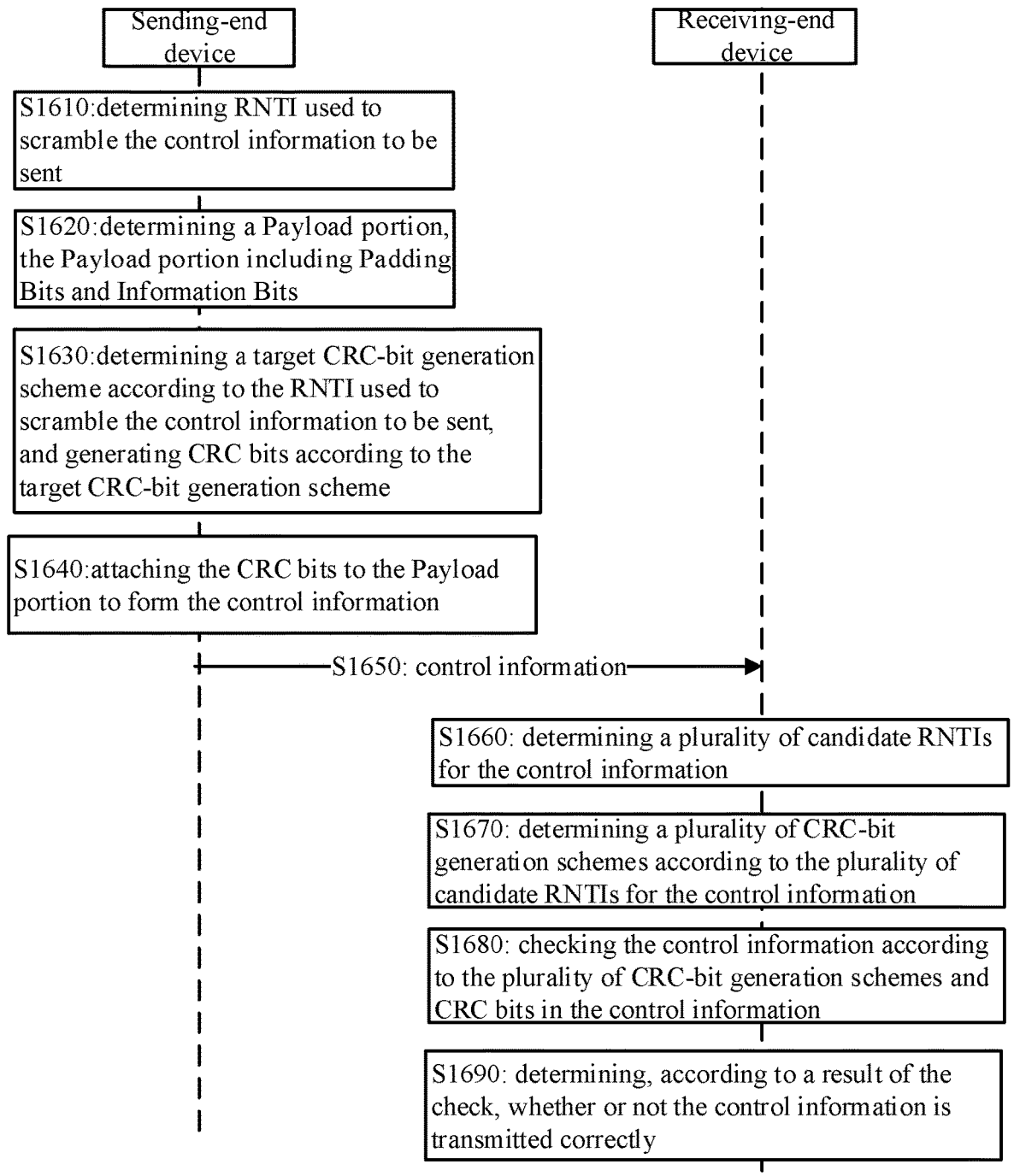
FIG. 16 is a seventh schematic flow chart of a method of cyclic redundancy check according to some embodiments of the present disclosure.

FIG. 16 is a method of cyclic redundancy check according to some embodiments of the present disclosure. As shown in FIG. 16, the method 1600 includes steps S1610-S1690.

S1610; determining, by a sending-end device, a Radio Network Temporary Identity (RNTI) used to scramble the control information to be sent.

Optionally, in S1610, the control information is the DCI, the RNTI is one of following RNTIs: SI-RNTI, P-RNTI, RA-RNTI, C-RNTI, TPC-PUCCH-RNTI, TPC-PUSCH-RNTI, and SPS S-RNTI.

S1620: determining, by the sending-end device, that there are Padding Bits, and supplementing, by the sending-end device, the Padding Bits to the Information Bits to be sent, to form a Payload.

S1630: determining, by the sending-end device, a generation scheme of target CRC bits according to the RNTI used to scramble the control information to be sent, and generating CRC bits according to the generation scheme of target CRC bits.

Optionally, the generation scheme of target CRC bits is one of a plurality of generation schemes of CRC bits described in the method 1400.

Optionally, the sending-end device selects different generation scheme of target CRC bits for control information scrambled with different RNTIs and having the same length at the Payload portions. Taking the DCI as an example, in order to reduce complexity of blind detection of a receiving-end device, a size of the Payload portion of the DCI scrambled with the Semi-Persistent Scheduling-RNTI (SPS-RNTI) and a size of the Payload portion of the DCI scrambled with the C-RNTI may be the same, but contents of the Payload portions of the DCIs scrambled with the Semi-Persistent Scheduling-RNTI and the DCI scrambled with the C-RNTI are different. Therefore, the sending-end device can select different generation scheme of target CRC bits for DCIs scrambled with SPS-RNTI and C-RNTI respectively.

Further, in a case that the Information Bits in the DCI scrambled with the SPS-RNTI include predetermined bits and the receiving-end device determines whether or not the control information is valid, whether or not the control information is valid needs to be determined further according to the result of the check and the transmission condition of the predetermined bits.

S1640: attaching the CRC bits to the Payload portion to form the control information.

S1650: sending the control information to the receiving-end device by the sending-end device.

S1660: determining a plurality of candidate RNTIs for the control information by the receiving-end device.

Specifically, in S1660, the receiving-end device determines a plurality of candidate RNTIs for the control information according to a technical specification of a protocol, or the receiving-end device determines a plurality of candidate RNTIs for the control information according to the configuration information from the sending-end device.

S1670: determining a plurality of generation schemes of CRC bits according to the plurality of candidate RNTIs for the control information by the receiving-end device.

Optionally, each of the plurality of candidate RNTIs for the control information corresponds to a generation scheme of CRC bits, or several candidate RNTIs correspond to the same generation scheme of CRC bits. A correspondence relation between the candidate RNTIs and the generation schemes of CRC bits may be specified by a protocol, or may be configured by the sending-end device through configuration information.

S1680: checking the control information according to the plurality of generation schemes of CRC bits and CRC bits in the control information by the receiving-end device.

Optionally, in S1680, the receiving-end device calculates CRC bits according to each of a plurality of generation schemes of CRC bits, and compares the calculated plurality of types of CRC bits with the CRC bits in the control information; if the calculated plurality of types of CRC bits include the same CRC bits as the CRC bits in the control information, check of the control information check is successful; an RNTI corresponding to a generation scheme of CRC bits for the same CRC bits as the CRC bits in the control information is the RNTI used for scrambling the control information. If the calculated plurality of types of CRC bits do not include the same CRC bits as the CRC bits in the control information, check of the control information is considered to be failed.

S1690: determining, according to a result of the check by the receiving-end device, whether or not the control information is transmitted correctly.

Specifically, if the check of the control information is successful in S1680, the control information is considered to be correctly transmitted in S1690. If the check of the control information is failed in S1680, the control information is considered to be incorrectly transmitted in S1690.

In some embodiments of the present disclosure, optionally, in S1530 in the method 1500 and in S1630 in the method 1600, the sending-end device may determine a generation scheme of target CRC bits from a plurality of generation schemes of CRC bits according to the format of the control information to be sent and according to the RNTI used to scramble the control information, and generates CRC bits according to the generation scheme of target CRC bits. Correspondingly, in S1570 in the method 1500 and in S1670 in the method 1600, the receiving-end device determines a plurality of generation schemes of CRC bits according to a plurality of candidate formats of the control information and a plurality of RNTIs used for scrambling the control information, and checks the control information according to the determined plurality of generation schemes of CRC bits and according to the CRC bits in the control information.

Figure 17:
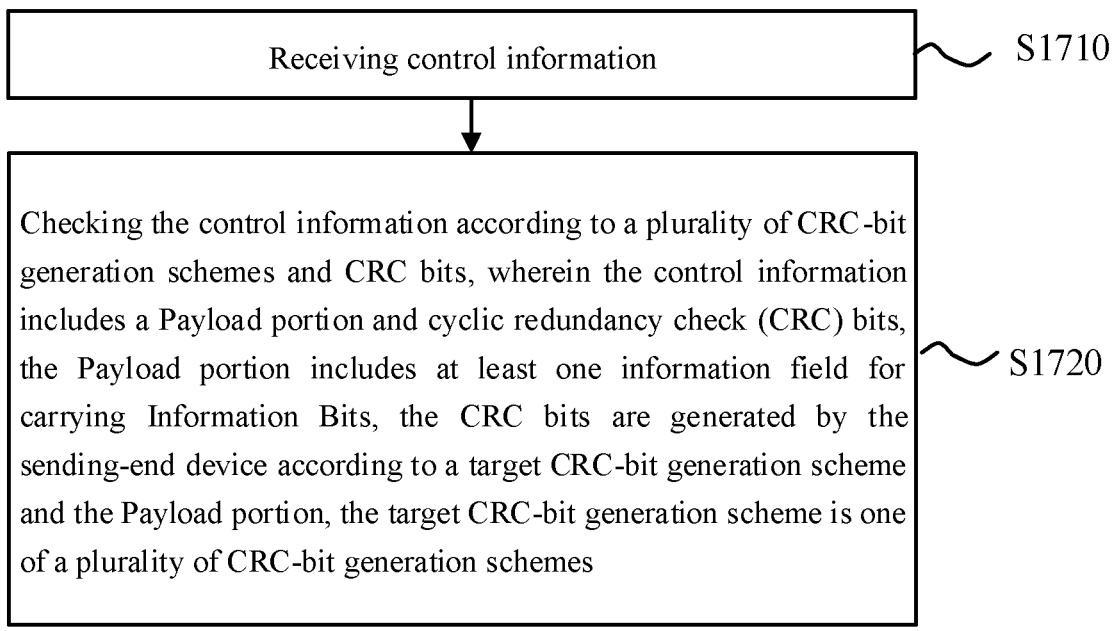
FIG. 17 is an eighth schematic flow chart of a method of cyclic redundancy check according to some embodiments of the present disclosure.

FIG. 17 illustrates a method of cyclic redundancy check 1700 according to some embodiments of the present disclosure. The method of cyclic redundancy check 1700 may be performed by a receiving-end device. It can be understood that description of interaction between the sending-end device and the receiving-end device described from the receiving-end device side is the same as description of the interaction between the sending-end device and the receiving-end device described from the sending-end device side, and related description is appropriately omitted in order to avoid repetition. As shown in FIG. 17, the method 1700 includes steps S1710-S1720.

S1710: receiving control information.

S1720: checking the control information according to a plurality of generation schemes of CRC bits and CRC bits, wherein the control information includes a Payload portion and cyclic redundancy check (CRC) bits, the Payload portion includes at least one information field for carrying Information Bits, the CRC bits are generated by the sending-end device according to a generation scheme of target CRC bits and the Payload portion, the generation scheme of target CRC bits is one of a plurality of generation schemes of CRC bits.

Optionally, as an example, in S1720, the receiving-end device generates the plurality of types of CRC bits according to the plurality of generation schemes of CRC bits, and compares the generated plurality of types of CRC bits with the CRC bits in the control information, and determines, according to a result of the comparison, whether or not the control information is transmitted correctly.

According to the method of cyclic redundancy check of some embodiments of the present disclosure, the CRC bits in the control information received by the receiving-end device are generated by the sending-end device according to a generation scheme of target CRC bits among a plurality of generation schemes of CRC bits. The receiving-end device checks the control information according to the plurality of generation schemes of CRC bits and the CRC bits in the control information, thereby improving performance of receiving the control information.

In some embodiments of the present disclosure, the plurality of generation schemes of CRC bits optionally include at least two of following CRC-code generation schemes: using Information Bits carried in all of the at least one information field as Input Bits for a process of generating the CRC bits; using Information Bits carried in a part of the at least one information field as Input Bits for the process of generating the CRC bits; using all bits carried in the Payload portion as Input Bits for the process of generating the CRC bits.

In some embodiments of the present disclosure, optionally, the receiving-end device determines, according to the plurality of candidate formats of the control information, the plurality of generation schemes of CRC bits; and/or the receiving-end device determines, according to a plurality of types of candidate Radio Network Temporary Identities (RNTIs) used for scrambling the control information, the plurality of types of generation schemes of CRC bits.

In some embodiments of the present disclosure, optionally, Information Bits carried in a first information field of the at least one information field are predetermined bits. The predetermined bits are used for the receiving-end device to determine, according to a transmission condition of the predetermined bits, whether or not the control information is valid. If the receiving-end device checks the control information successfully according to the plurality of generation schemes of CRC bits and the CRC bits, the receiving-end device determines, according to the transmission condition of the predetermined bits, whether or not the control information is valid. It is determined that the control information is valid if the predetermined bits are correctly transmitted; it is determined that the control information is invalid if the predetermined bits are incorrectly transmitted.

In some embodiments of the present disclosure, a second information field of the at least one information field is optionally used to indicate a format of the control information. The receiving-end device obtains all bits carried in the Payload portion according to the format of the control information, and then checks the control information according to the plurality of generation schemes of CRC bits, some or all of the bits carried in the Payload portion and the CRC bits.

In some embodiments of the present disclosure, the Payload portion optionally further includes a padding field for carrying Padding Bits.

In some embodiments of the present disclosure, optionally, a position of the padding field in the control information is between a position of the at least one information field and a position of the CRC bits; or, the position of the CRC bits in the control information is between the position of the at least one information field and the position of the padding field.

In some embodiments of the present disclosure, the method of cyclic redundancy check according to some embodiments of the present disclosure is described in detail above in connection with FIGS. 3, 4, 14-17. The sending-end device according to some embodiments of the present disclosure will be described in detail below in conjunction with FIG. 18.

Figure 18:
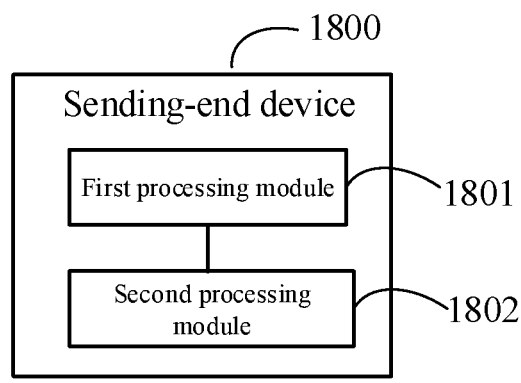
FIG. 18 is a third schematic structural diagram of a sending-end device according to some embodiments of the present disclosure.

FIG. 18 is a schematic structural diagram of a sending-end device according to some embodiments of the present disclosure. As shown in FIG. 18, the sending-end device 1800 includes a first processing module 1801 and a second processing module 1802.

The first processing module 1801 is used to determine a Payload portion, the Payload portion including at least one information field for carrying Information Bits. The first processing module 1801 is further used to determine a target cyclic redundancy check (CRC) bit generation scheme, the generation scheme of target CRC bits is one of a plurality of generation schemes of CRC bits.

The second processing module 1802 is used to generate the CRC bits according to the Payload portion and the generation scheme of target CRC bits; the second processing module 1802 is further used to generate control information including the Payload portion and the CRC bits.

The sending-end device according to some embodiments of the present disclosure determines the generation scheme of target CRC bits from the plurality of generation schemes of CRC bits, generates the CRC bits according to the determined Payload portion and the generation scheme of target CRC bits, and generate the control information including the Payload portion and the CRC bits generated according to the generation scheme of target CRC bits. The sending-end device may select different generation scheme of target CRC bits for different pieces of control information, meet individual requirements of the control information on a Block Error Rate and a False Alarm, and improve performance of receiving the control information.

Optionally, as an example, the plurality of generation schemes of CRC bits include at least two of following: using Information Bits carried in all of the at least one information field as Input Bits for a process of generating the CRC bits; using Information Bits carried in a part of the at least one information field as Input Bits for the process of generating the CRC bits; using all bits carried in the Payload portion as Input Bits for the process of generating the CRC bits.

Optionally, as an example, the first processing module 1801 is specifically used to determine the generation scheme of target CRC bits according to the format of the control information; and/or determine the generation scheme of target CRC bits according to the type of a Radio Network Temporary Identity (RNTI) used to scramble the control information.

Optionally, as an example, Information Bits carried in a first information field of the at least one information field are predetermined bits. The predetermined bits are used for the receiving-end device to determine, according to a transmission condition of the predetermined bits, whether or not the control information is valid.

Optionally, as an example, a second information field of the at least one information field is used to indicate a format of the control information.

Optionally, as an example, the Payload portion further includes a padding field for carrying Padding Bits.

Optionally, as an example, a position of the padding field in the control information is between a position of the at least one information field and a position of the CRC bits; or, the position of the CRC bits in the control information is between the position of the at least one information field and the position of the padding field.

Description of the sending-end device according to some embodiments of the present disclosure may be obtained by referring to the flows of the method 1400 to the method 1600 corresponding to some embodiments of the present disclosure, and, each unit/module in the sending-end device and the above-mentioned other operations and/or functions are respectively used to implement corresponding flows in the method 1400 to the method 1600, and are not repeated here for sake of brevity.

Figure 19:
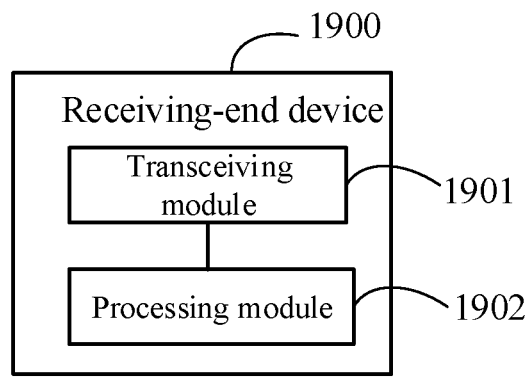
FIG. 19 is a third schematic structural diagram of a receiving-end device according to some embodiments of the present disclosure.

FIG. 19 is a schematic structural diagram of a receiving-end device according to some embodiments of the present disclosure. As shown in FIG. 19, the receiving-end device 1900 includes a transceiving module 1901 and a processing module 1902.

The transceiving module 1901 is used to receive control information. The processing module 1902 is used to check the control information according to a plurality of generation schemes of CRC bits and CRC bits, wherein the control information includes a Payload portion and cyclic redundancy check (CRC) bits, the Payload portion includes at least one information field for carrying Information Bits, the CRC bits are generated by the sending-end device according to a generation scheme of target CRC bits and the Payload portion, the generation scheme of target CRC bits is one of a plurality of generation schemes of CRC bits.

The CRC bits in the control information received by the receiving-end device according to some embodiments of the present disclosure are generated by the sending-end device according to a generation scheme of target CRC bits among a plurality of generation schemes of CRC bits. The receiving-end device checks the control information according to the plurality of generation schemes of CRC bits and the CRC bits in the control information, and can improve the performance of receiving the control information.

Optionally, as an example, the plurality of generation schemes of CRC bits include at least two of following CRC-code generation schemes: using Information Bits carried in all of the at least one information field as Input Bits for a process of generating the CRC bits; using Information Bits carried in a part of the at least one information field as Input Bits for the process of generating the CRC bits; using all bits carried in the Payload portion as Input Bits for the process of generating the CRC bits.

Optionally, as an example, the processing module 1902 is further used to determine, according to the plurality of candidate formats of the control information, the plurality of generation schemes of CRC bits; and/or determine, according to a plurality of types of candidate Radio Network Temporary Identities (RNTIs) used for scrambling the control information, the plurality of types of generation schemes of CRC bits.

Optionally, as an example, Information Bits carried in a first information field of the at least one information field are predetermined bits. The predetermined bits are used for the receiving-end device to determine, according to a transmission condition of the predetermined bits, whether or not the control information is valid. The processing module 1902 is further configured to: if the control information is checked successfully according to the plurality of generation schemes of CRC bits and the CRC bits, determine, according to the transmission condition of the predetermined bits, whether or not the control information is valid, wherein it is determined that the control information is valid if the predetermined bits are correctly transmitted; it is determined that the control information is invalid if the predetermined bits are incorrectly transmitted.

Optionally, as an example, a second information field of the at least one information field is used to indicate a format of the control information.

The processing module 1902 is specifically used to obtain all bits carried in the Payload portion according to the format of the control information, and then check the control information according to the plurality of generation schemes of CRC bits, some or all of the bits carried in the Payload portion and the CRC bits.

Optionally, as an example, the Payload portion further includes a padding field for carrying Padding Bits.

Optionally, as an example, a position of the padding field in the control information is between a position of the at least one information field and a position of the CRC bits; or, the position of the CRC bits in the control information is between the position of the at least one information field and the position of the padding field.

Description of the receiving-end device according to some embodiments of the present disclosure may be obtained by referring to flows of the methods 1500 to 1700 corresponding to some embodiments of the present disclosure. Each unit/module in the receiving-end device and above-mentioned other operations and/or functions implement corresponding flows in the methods 1500 to 1700, respectively, and are not repeated herein for sake of brevity.

Figure 20:
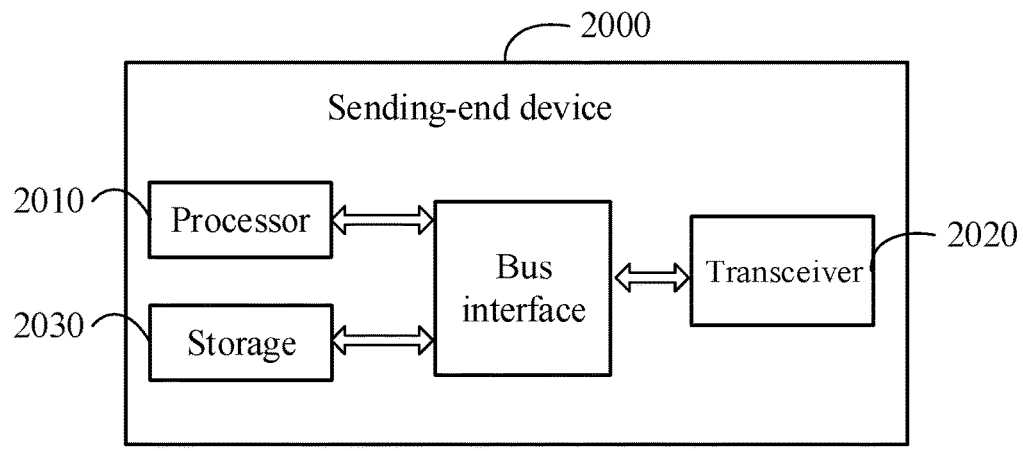
FIG. 20 is a fourth schematic structural diagram of a sending-end device according to some embodiments of the present disclosure.

FIG. 20 shows a schematic structural diagram of a sending-end device according to some embodiments of the present disclosure. The sending-end device may implement details of a method of cyclic redundancy check in the methods 1400 to 1600, and achieve the same effect. As shown in FIG. 20, the sending-end device 2000 includes a processor 2010, a transceiver 2020, a storage 2030, and a bus interface.

In some embodiments of the present disclosure, the sending-end device 2000 further includes a computer program stored on the storage 2030 and executable by the processor 2010. In a case that the computer program is executed by the processor 2010, the processor 2010 performs following steps: determining a Payload portion, the Payload portion including at least one information field for carrying Information Bits; determining a target cyclic redundancy check (CRC) bit generation scheme, the generation scheme of target CRC bits being one of a plurality of generation schemes of CRC bits; generating the CRC bits according to the Payload portion and the generation scheme of target CRC bits; and generating control information including the Payload portion and the CRC bits.

In FIG. 20, a bus architecture may include any number of interconnected buses and bridges. Specifically, various circuits including one or more processors represented by the processor 2010 and a storage represented by the storage 2030 are linked together by the bus architecture. The bus architecture may also link together a variety of other circuits, such as peripherals, regulators, and power management circuits, which are well known in the art and, therefore, will not be described further herein. A bus interface provides an interface. The transceiver 2020 may be a plurality of elements, including a transmitter and a receiver, for providing means for communicating with various other devices over a transmission medium.

The processor 2010 is responsible for managing the bus architecture and general processing, and the storage 2030 may store data used by the processor 2010 when the processor 2010 performs operations.

Optionally, in a case that the computer program is executed by the processor 2010, the processor 2010 may further implement following steps: determining the generation scheme of target CRC bits according to the format of the control information; and/or determining the generation scheme of target CRC bits according to the type of a Radio Network Temporary Identity (RNTI) used to scramble the control information.

Optionally, as an example, the plurality of generation schemes of CRC bits include at least two of following: using Information Bits carried in all of the at least one information field as Input Bits for a process of generating the CRC bits; using Information Bits carried in a part of the at least one information field as Input Bits for the process of generating the CRC bits; using all bits carried in the Payload portion as Input Bits for the process of generating the CRC bits.

Optionally, as an example, Information Bits carried in a first information field of the at least one information field are predetermined bits. The predetermined bits are used for the receiving-end device to determine, according to a transmission condition of the predetermined bits, whether or not the control information is valid.

Optionally, as an example, a second information field of the at least one information field is used to indicate a format of the control information.

Optionally, as an example, the Payload portion further includes a padding field for carrying Padding Bits.

Optionally, as an example, a position of the padding field in the control information is between a position of the at least one information field and a position of the CRC bits; or, the position of the CRC bits in the control information is between the position of the at least one information field and the position of the padding field.

The sending-end device according to some embodiments of the present disclosure determines the generation scheme of target CRC bits from a plurality of generation schemes of CRC bits, generates the CRC bits according to the determined Payload portion and the generation scheme of target CRC bits, and generates control information including the Payload portion and the CRC bits generated according to the generation scheme of target CRC bits. The sending-end device may select different generation scheme of target CRC bits for different pieces of control information, meet individual requirements of the control information on a Block Error Rate and a False Alarm, and improve the performance of receiving the control information.

Description of the sending-end device 2000 according to some embodiments of the present disclosure may be obtained by referring to the flows of the sending-end device 1900 corresponding to some embodiments of the present disclosure, and, each unit/module in the sending-end device and the above-mentioned other operations and/or functions are respectively used to implement corresponding flows in the method 1400 to the method 1600, and are not repeated here for sake of brevity.

Figure 21:
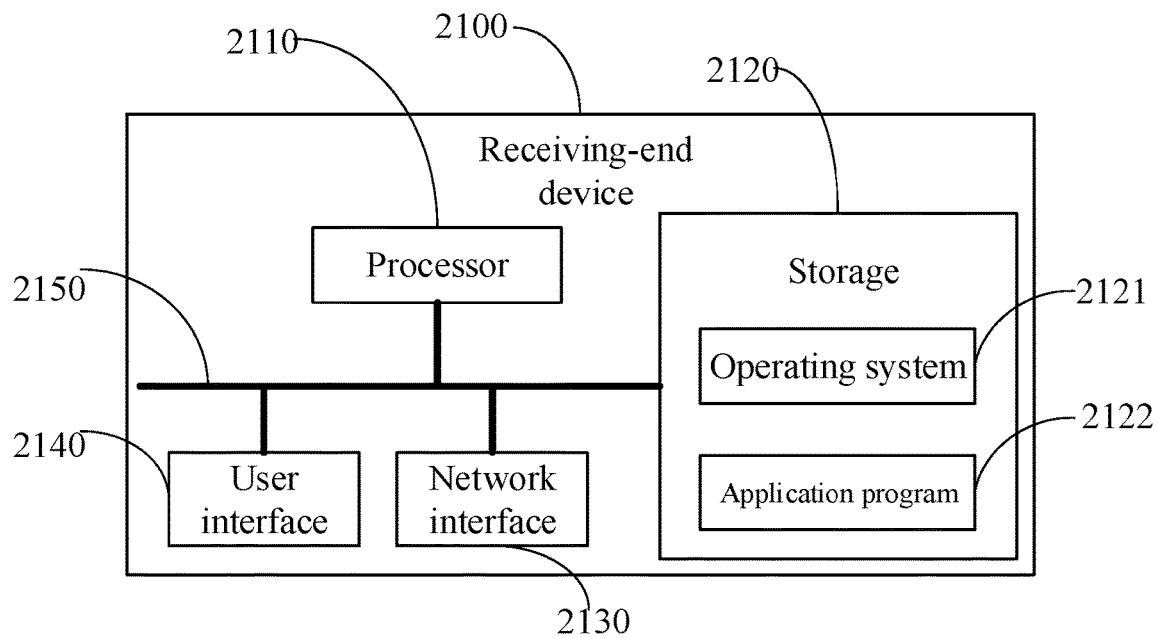
FIG. 21 is a fourth schematic structural diagram of a receiving-end device according to some embodiments of the present disclosure.

FIG. 21 shows a schematic structural diagram of a receiving-end device according to some embodiments of the present disclosure. As shown in FIG. 21, the receiving-end device 2100 includes at least one processor 2110, a storage 2120, at least one network interface 2130 and a user interface 2140. Various components in the receiving-end device 2100 are coupled together by a bus system 2150. It will be appreciated that the bus system 2150 is used to enable connection communication among these components. The bus system 2150 includes a data bus, a power bus, a control bus, and a status signal bus. However, for clarity of illustration, various buses are designated as the bus system 2150 in FIG. 21.

The user interface 2140 may include a display, a keyboard, or a pointing device (e.g., a mouse, a trackball, a touch pad, or a touch screen, etc.).

It will be appreciated that the storage 2120 in some embodiments of the present disclosure may be a volatile storage or a non-volatile storage, or may include both the volatile storage and the non-volatile storage. The non-volatile storage may be a Read-Only Memory (ROM), a Programmable ROM (PROM), an Erasable PROM (EPROM), an Electrically Erasable Programmable Read Only Memory (EEPROM), or a Flash Memory. The volatile storage may be a Random Access Memory (RAM), which serves as an external cache. By way of example, but not by way of limitation, many forms of RAMs may be used, such as a Static Random Access Memory (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a DirectRambus RAM (DRRAM). The storage 2120 of the systems and methods described by some embodiments of the present disclosure is intended to include, but is not limited to, these and any other suitable types of memories.

In some embodiments, the storage 2120 stores following elements, executable modules or data structures, or a subset thereof, or an extension set thereof: an operating system 2121 and an application program 2122.

The operating system 2121 includes various system programs, such as a framework layer, a core library layer, and a driver layer, for implementing various basic services and processing hardware-based tasks. The application program 2122 includes various application programs, such as a Media Player, a Browser, and the like, for implementing various application services. Programs implementing the methods of some embodiments of the present disclosure may be included in the application program 2122.

In some embodiments of the present disclosure, the receiving-end device 2100 further includes a computer program stored on the storage 2120 and executable by the processor 2110. In a case that the computer program is executed by the processor 2110, the processor 2110 performs following steps: receiving control information; checking the control information according to a plurality of generation schemes of CRC bits and CRC bits, wherein the control information includes a Payload portion and cyclic redundancy check (CRC) bits, the Payload portion includes at least one information field for carrying Information Bits, the CRC bits are generated by the sending-end device according to a generation scheme of target CRC bits and the Payload portion, the generation scheme of target CRC bits is one of a plurality of generation schemes of CRC bits.

The methods disclosed by some embodiments of the present disclosure described above may be applied to, or implemented by, the processor 2110. The processor 2110 may be an integrated circuit chip with signal processing capability. In implementation, the steps of the methods described above may be accomplished by integrated logic circuitry of hardware in the processor 2110 or instructions in a form of software. The processor 2110 may be a general-purpose processor, a Digital Signal Processor (DSP), an Application Specific Integrated Circuit (ASIC), a Field Programmable Gate Array (FPGA) or other programmable logic devices, discrete gates or transistor logic devices, discrete hardware components. The methods, steps, and logic blocks disclosed in some embodiments of the present disclosure may be implemented or performed. The general purpose processor may be a microprocessor or the processor may be any conventional processor or the like. The steps of the methods disclosed in connection with some embodiments of the present disclosure may be implemented directly as execution by a hardware decoding processor, or as a combination of hardware and software modules in a decoding processor. A software module may be located in a computer readable storage medium mature in the art, such as a random access memory, a flash memory, a read only memory, a programmable read only memory, or an electrically erasable programmable memory, a register, etc. The computer readable storage medium is located in the storage 2120, and the processor 2110 reads information in the storage 2120 and performs the steps of the method described above in conjunction with hardware of the processor 2110. In particular, the computer readable storage medium has stored thereon a computer program, wherein in a case that the computer program is executed by the processor 2110, the processor 2110 implements various steps of the embodiments of the methods 1500-1700 described above.

It will be appreciated that the embodiments described in the present disclosure may be implemented in hardware, software, firmware, middleware, a microcode, or a combination thereof. For hardware implementation, a processing unit may be implemented in one or more of an Application Specific Integrated Circuit (ASIC), a Digital Signal Processor (DSP), a DSP Device (DSPD), a Programmable Logic Device (PLD), a Field-Programmable Gate Array (FPGA), a general purpose processor, a controller, a microcontroller, a microprocessor, other electronic units for performing the functions described in the present disclosure, or a combination thereof.

For software implementation, techniques described in some embodiments of the present disclosure may be implemented by modules (e.g., processes, functions, etc.) that perform the functions described in some embodiments of the disclosure. A software code may be stored in a storage and executed by a processor. The storage may be implemented in the processor or external to the processor.

Optionally, in a case that the computer program is executed by the processor 2110, the processor 2110 may further implement followings steps: determining the plurality of generation schemes of CRC bits according to the plurality of candidate formats of the control information; and/or determining the plurality of generation schemes of CRC bits according to the plurality of candidate Radio Network Temporary Identities (RNTIs) for scrambling the control information.

Optionally, as one example, the plurality of generation schemes of CRC bits include at least two of following CRC-code generation schemes: using Information Bits carried in all of the at least one information field as Input Bits for a process of generating the CRC bits; using Information Bits carried in a part of the at least one information field as Input Bits for the process of generating the CRC bits; using all bits carried in the Payload portion as Input Bits for the process of generating the CRC bits.

Optionally, as an example, Information Bits carried in a first information field of the at least one information field are predetermined bits. The predetermined bits are used for the receiving-end device to determine, according to a transmission condition of the predetermined bits, whether or not the control information is valid. In a case that the computer program is executed by the processor 2110, the processor 2110 further implements following steps: if the control information is checked successfully according to the plurality of generation schemes of CRC bits and the CRC bits, determining, according to the transmission condition of the predetermined bits, whether or not the control information is valid; wherein it is determined that the control information is valid if the predetermined bits are correctly transmitted; it is determined that the control information is invalid if the predetermined bits are incorrectly transmitted.

Optionally, as an example, a second information field of the at least one information field is used to indicate a format of the control information. In a case that the computer program is executed by the processor 2110, the processor 2110 further implements the following steps: obtaining all bits carried in the Payload portion according to the format of the control information; checking the control information according to the plurality of generation schemes of CRC bits, a part or all of the bits carried in the Payload portion, and the CRC bits.

Optionally, as an example, the Payload portion further includes a padding field for carrying Padding Bits.

Optionally, as an example, a position of the padding field in the control information is between a position of the at least one information field and a position of the CRC bits; or, the position of the CRC bits in the control information is between the position of the at least one information field and the position of the padding field. The CRC bits in the control information received by the receiving-end device according to some embodiments of the present disclosure are generated by the sending-end device according to a generation scheme of target CRC bits among a plurality of generation schemes of CRC bits. The receiving-end device checks the control information according to the plurality of generation schemes of CRC bits and the CRC bits in the control information, thereby improving performance of receiving the control information.

Description of the receiving-end device 2100 according to some embodiments of the present disclosure may be obtained by referring to the receiving device 1900 corresponding to some embodiments of the present disclosure. Each unit/module in the receiving-end device and above-mentioned other operations and/or functions implement corresponding flows in the methods 1500 to 1700, respectively, and are not repeated herein for sake of brevity.

In the method provided in the above embodiments of the present disclosure, the sending-end device determines the generation scheme of target CRC bits from the plurality of generation schemes of CRC bits, generates the CRC bits according to the determined Payload portion and the generation scheme of target CRC bits, and generates the control information including the Payload portion and the CRC bits generated according to the generation scheme of target CRC bits. The sending-end device may select different generation scheme of target CRC bits for different pieces of control information, meet individual requirements of the control information on a Block Error Rate and a False Alarm, and improve performance of receiving the control information.

Some embodiments of the present disclosure also provide a computer program product including instructions. In a case that a computer executes the instructions of the computer program product, the computer performs the method of cyclic redundancy check of the method embodiments described above. In particular, the computer program product may be executed on the above-described sending-end device and the receiving-end device.

A person skilled in the art may be aware that, exemplary units and algorithm steps described in connection with the embodiments disclosed herein may be implemented by electronic hardware or a combination of computer software and electronic hardware. Whether the functions are performed by hardware or software depends on particular applications and design constraint conditions of the technical solutions. A person skilled in the art may use different methods to implement the described functions for various particular applications, but it should not be considered that the implementation goes beyond the scope of the present disclosure.

It may be clearly understood by a person skilled in the art that, for ease of description and conciseness, a detailed working process of the foregoing system, apparatus, and unit, may be obtained by referring to a corresponding process in the foregoing method embodiments, and details are not described herein again.

In the embodiments provided in the present application, it should be understood that the disclosed device and method may be implemented in other manners. For example, the described device embodiment is merely exemplary. For example, the unit division is merely a logical function division and may be other division in actual implementations. For example, a plurality of units or components may be combined or integrated into another system, or some features may be ignored or not performed. In addition, a mutual coupling or a direct coupling or a communication connection shown or discussed may be an indirect coupling or a communication connection through some interfaces, devices or units, and may be in an electrical connection, a mechanical connection or other forms of connection.

Units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, various functional units in various embodiments of the present disclosure may be integrated into one processing unit, or each of the units may exist alone physically, or two or more units may be integrated into one unit.

If a function is implemented in form of a software functional unit and sold or used as an independent product, the software functional unit may be stored in a computer readable storage medium. Based on such an understanding, essential part of the present disclosure or the part contributing to the prior art of the technical solutions of the present disclosure, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present disclosure. The foregoing storage medium includes any medium, such as a Universal Serial Bus (USB) flash drive, a removable hard disk, an ROM, an RAM, a magnetic disk, or an optical disc, or the like, that may store a program code.

The aforementioned are merely specific implementations of the present disclosure, but the scope of the disclosure is by no means limited thereto. Any modifications or substitutions that would easily occurred to those skilled in the art, without departing from the technical scope of the present disclosure, should be encompassed in the protection scope of the present disclosure. Therefore, the protection scope of the present disclosure is to be determined by the protection scope of the claims.

What is claimed is:

1. A method of cyclic redundancy check applied to a sending-end device, the method comprising:
    determining a payload portion, the payload portion comprising at least one information field, the at least one information field being used for carrying information bits;
    determining input bits for generating cyclic redundancy check (CRC) bits, the input bits comprising information bits carried in a part or all of at least one information field;
    generating target CRC bits according to the input bits;
    generating control information comprising the payload portion and the target CRC bits,
    wherein,
    a first information field in the at least one information field is used to indicate a format of the control information; and/or,
    information bits carried in a second information field in the at least one information field are predetermined bits, the predetermined bits are used by a receiving-end device to determine, according to a transmission condition of the predetermined bits, whether or not the control information is valid.

2. The method according to claim 1, wherein the payload portion further comprises a padding field for carrying padding bits; the input bits comprise information bits carried in all of the at least one information field, a position of the padding field in the control information is between a position of the at least one information field and a position of the target CRC bits, or, the position of the target CRC bits in the control information is between the position of the at least one information field and the position of the padding field; or
    the payload portion further comprises a padding field for carrying padding bits; the input bits comprise information bits carried in a part of the at least one information field, a position of the padding field in the control information is between a position of the at least one information field and a position of the target CRC bits, or, the position of the target CRC bits in the control information is between the position of the part of the at least one information field and positions of an information field other than the part of the at least one information field, or between the position of the part of the at least one information field and the padding field.

3. The method according to claim 1, further comprising:
    sending configuration information to a receiving-end device, wherein the configuration information is used to indicate that the input bits comprise information bits carried in a part or all of at least one information field.

4. A sending-end device, comprising:
    a storage, a processor, and a cyclic redundancy check program stored on the storage and executable by the processor, wherein in a case that the cyclic redundancy check program is executed by the processor, the processor implements steps of the method of cyclic redundancy check according to claim 1.

5. A method of cyclic redundancy check applied to a receiving-end device, the method comprising:
    receiving control information;
    checking the control information according to input bits and target cyclic redundancy check (CRC) bits;
    wherein the control information comprises a payload portion and target CRC bits, the payload portion comprises at least one information field for carrying information bits, the target CRC bits are generated by a sending-end device based on input bits used for generating CRC bits, the input bits comprise information bits carried in a part or all of at least one information field, wherein,
a first information field in the at least one information field is used to indicate a format of the control information; and/or,
information bits carried in a second information field in the at least one information field are predetermined bits, the predetermined bits are used by a receiving-end device to determine, according to a transmission condition of the predetermined bits, whether or not the control information is valid.

6. The method according to claim 5, wherein the payload portion further comprises a padding field for carrying padding bits; the input bits comprise information bits carried in all of the at least one information field, a position of the padding field in the control information is between a position of the at least one information field and a position of the target CRC bits, or, the position of the target CRC bits in the control information is between the position of the at least one information field and the position of the padding field; or,
 the payload portion further comprises a padding field for carrying the padding bits; the input bits comprise information bits carried in a part of the at least one information field, a position of the padding field in the control information is between the position of the at least one information field and the position of the target CRC bits, or, the position of the target CRC bits in the control information is between the position of the part of the at least one information field and a position of an information field other than the part of the at least one information field, or between the position of the part of the at least one information field and the padding field.

7. The method according to claim 5, wherein in case that the first information field in the at least one information field is used to indicate the format of the control information; wherein, before checking the control information according to the input bits and the target CRC bits, the method further comprises acquiring the input bits according to the format of the control information; and/or
 in case that the information bits carried in the second information field in the at least one information field are predetermined bits, the predetermined bits are used for the receiving-end device to determine, according to the transmission condition of the predetermined bits, whether or not the control information is valid, the method further comprises: if the control information is checked successfully, determining whether or not the control information is valid according to the transmission condition of the predetermined bits; wherein the control information is determined to be valid if the transmitted predetermined bits are correct; the control information is determined to be invalid if the transmitted predetermined bits are incorrect.

8. The method according to claim 5, wherein before checking the control information according to the input bits and the target CRC bits, the method further comprises:
 receiving configuration information sent by the sending-end device, wherein the configuration information is used to indicate that the input bits comprise information bits carried in a part or all of at least one information field;
 obtaining the input bits according to the configuration information.

9. A receiving-end device, comprising:
 a storage, a processor, and a cyclic redundancy check program stored on the storage and executable by the processor, wherein in a case that the cyclic redundancy check program is executed by the processor, the processor implements steps of the method of cyclic redundancy check according to claim 5.

10. A method of cyclic redundancy check, applied to a sending-end device, the method comprising:
 determining a payload portion, the payload portion comprising at least one information field for carrying information bits;
 determining a generation scheme of target cyclic redundancy check (CRC) bits, the generation scheme of target CRC bits is one of a plurality of generation schemes of CRC bits;
 generating CRC bits according to the payload portion and the generation scheme of target CRC bits;
 generating control information comprising the payload portion and the CRC bits,
 wherein,
 information bits carried in a first information field of the at least one information field are predetermined bits; the predetermined bits are used for a receiving-end device to determine, according to a transmission condition of the predetermined bits, whether or not the control information is valid; and/or
 a second information field of the at least one information field is used to indicate a format of the control information.

11. The method according to claim 10, wherein the plurality of generation schemes of CRC bits comprise at least two of following (i)-(iii):
 (i) using information bits carried in all of the at least one information field as input bits for a process of generating the CRC bits;
 (ii) using information bits carried in a part of the at least one information field as input bits for the process of generating the CRC bits;
 (iii) using all bits carried in the payload portion as input bits for the process of generating the CRC bits.

12. The method according to claim 10, wherein determining the generation scheme of target CRC bits, comprises:
 determining the generation scheme of target CRC bits according to a format of the control information; and/or
 determining the generation scheme of target CRC bits according to a type of a Radio Network Temporary Identity (RNTI) used to scramble the control information.

13. A sending-end device, comprising:
 a storage, a processor, and a cyclic redundancy check program stored on the storage and executable by the processor, wherein in a case that the cyclic redundancy check program is executed by the processor, the processor implements steps of the method of cyclic redundancy check according to claim 10.

14. A method of cyclic redundancy check applied to a receiving-end device, the method comprising:
 receiving control information;
 checking the control information according to a plurality of generation schemes of CRC bits and cyclic redundancy check (CRC) bits,
 wherein the control information comprises a payload portion and CRC bits, the payload portion comprises at least one information field for carrying information bits, the CRC bits are generated by a sending-end device according to a generation scheme of target CRC bits and the payload portion, the generation scheme of target CRC bits is one of a plurality of generation schemes of CRC bits, wherein,
information bits carried in a first information field of the at least one information field are predetermined bits; the predetermined bits are used for a receiving-end device to determine, according to a transmission condition of the predetermined bits, whether or not the control information is valid; and/or a second information field of the at least one information field is used to indicate a format of the control information.

15. The method according to claim 14, wherein the plurality of generation schemes of CRC bits comprise at least two of following (i)-(iii):
   (i) using information bits carried in all of the at least one information field as input bits for a process of generating the CRC bits;
   (ii) using information bits carried in a part of the at least one information field as input bits for the process of generating the CRC bits;
   (iii) using all bits carried in the payload portion as input bits for the process of generating the CRC bits.

16. The method according to claim 14, further comprising:
   determining, according to a plurality of candidate formats of the control information, the plurality of generation schemes of CRC bits; and/or
   determining, according to a plurality of types of candidate Radio Network Temporary Identities (RNTIs) used for scrambling the control information, the plurality of types of generation schemes of CRC bits.

17. The method according to claim 14, wherein,
   in case that the information bits carried in the first information field of the at least one information field are predetermined bits, the predetermined bits are used for the receiving-end device to determine, according to the transmission condition of the predetermined bits, whether or not the control information is valid, the method further comprises:
      if the control information is checked successfully according to the plurality of generation schemes of CRC bits and the CRC bits, determining, according to the transmission condition of the predetermined bits, whether or not the control information is valid, wherein the control information is determined to be valid if the predetermined bits are correctly transmitted; the control information is determined to be invalid if the predetermined bits are incorrectly transmitted; and/or
   in case that the second information field of the at least one information field is used to indicate the format of the control information;
   wherein checking the control information according to the plurality of generation schemes of CRC bits and the CRC bits comprises:
      obtaining all bits carried in the payload portion according to the format of the control information, and
      checking the control information according to the plurality of generation schemes of CRC bits, some or all of the bits carried in the payload portion and the CRC bits.

18. A receiving-end device, comprising:
a storage, a processor, and a cyclic redundancy check program stored on the storage and executable by the processor, wherein in a case that the cyclic redundancy check program is executed by the processor, the processor implements steps of the method of cyclic redundancy check according to claim 14.

* * * * *